(12) United States Patent
Walker, Jr. et al.

(10) Patent No.: US 10,513,626 B2
(45) Date of Patent: Dec. 24, 2019

(54) STAIN RESISTANT MICROSPHERE ARTICLES

(71) Applicant: 3M INNOVATIVE PROPERTIES COMPANY, St. Paul, MN (US)

(72) Inventors: Christopher B. Walker, Jr., St. Paul, MN (US); John C. Clark, Maplewood, MN (US); Tatsuo Fukushi, Woodbury, MN (US); Thomas P. Klun, Lakeland, MN (US); Vivek Krishnan, St. Paul, MN (US); Alexander J. Kugel, Woodbury, MN (US); Lan H. Liu, Rosemount, MN (US); Jingjing Ma, Cottage Grove, MN (US); Steven J. McMan, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 827 days.

(21) Appl. No.: 14/900,185

(22) PCT Filed: Jun. 26, 2014

(86) PCT No.: PCT/US2014/044233
§ 371 (c)(1),
(2) Date: Dec. 21, 2015

(87) PCT Pub. No.: WO2014/210249
PCT Pub. Date: Dec. 31, 2014

(65) Prior Publication Data
US 2016/0145458 A1    May 26, 2016

Related U.S. Application Data

(60) Provisional application No. 61/908,869, filed on Nov. 26, 2013, provisional application No. 61/898,279, filed on Oct. 31, 2013, provisional application No. 61/839,662, filed on Jun. 26, 2013.

(51) Int. Cl.
| | | |
|---|---|---|
| C09D 127/18 | (2006.01) |
| C09D 127/12 | (2006.01) |
| C09D 5/00 | (2006.01) |
| C09D 127/16 | (2006.01) |
| C09D 127/20 | (2006.01) |
| C08K 7/18 | (2006.01) |
| C08K 7/20 | (2006.01) |

(52) U.S. Cl.
CPC ............ C09D 127/18 (2013.01); C09D 5/00 (2013.01); C09D 127/12 (2013.01); C09D 127/16 (2013.01); C09D 127/20 (2013.01); C08K 7/18 (2013.01); C08K 7/20 (2013.01)

(58) Field of Classification Search
CPC ...... C09D 127/18; C09D 7/70; C09D 127/16; C08K 7/18; C08K 7/20
See application file for complete search history.

(56) References Cited

U.S. PATENT DOCUMENTS

| | | | |
|---|---|---|---|
| 4,248,500 A | 2/1981 | Pernicano | |
| 4,345,057 A | 8/1982 | Yamabe | |
| 4,348,312 A * | 9/1982 | Tung | ........................ C08K 7/20 |
| | | | 428/144 |
| 4,634,754 A | 1/1987 | Ohmori | |
| 4,667,000 A | 5/1987 | Ohmor | |
| 4,849,265 A | 7/1989 | Ueda | |
| 5,169,915 A | 12/1992 | Mohri | |
| 5,620,775 A * | 4/1997 | LaPerre | ................. G02B 5/128 |
| | | | 156/298 |
| 5,656,713 A | 8/1997 | Sarpeshkar | |
| 5,928,778 A | 7/1999 | Takahashi | |
| 6,025,436 A | 2/2000 | Kawashima | |
| 6,040,044 A | 3/2000 | Takahashi | |
| 6,197,393 B1 | 3/2001 | Jing | |
| 6,610,807 B2 | 8/2003 | Duchesne | |
| 6,646,088 B2 | 11/2003 | Fan | |

(Continued)

FOREIGN PATENT DOCUMENTS

| | | |
|---|---|---|
| CN | 101314684 | 12/2008 |
| CN | 101319113 | 12/2008 |

(Continued)

OTHER PUBLICATIONS

International Search Report for PCT International Application No. PCT/US2014/044233, dated Nov. 21, 2014, 3 pages.

*Primary Examiner* — Kara B Boyle
(74) *Attorney, Agent, or Firm* — Qiang Han

(57) ABSTRACT

There is provided an article comprising at least a first surface having a fluorine-containing polymeric binder resin layer and a plurality of microspheres partially embedded in a first major surface of the binder resin layer and adhered thereto; wherein the fluorine-containing polymer is derived in part from at least one partially fluorinated, or non-fluorinated, monomer; and wherein the article exhibits a stain resistance to yellow mustard at elevated temperature and humidity as measured by the change in b* of less than 50. There are also provided such articles wherein the fluorine-containing polymer is derived in part from at least one partially fluorinated, or non-fluorinated, monomer; and wherein the fluorine content along the polymeric backbone of the fluorine-containing polymer is from about 27% to 72% by weight. There are also provided such articles wherein the article is a thermoformable article exhibiting chemical resistance according to ASTM D5402-06.

19 Claims, 1 Drawing Sheet

(56) References Cited

U.S. PATENT DOCUMENTS

| | | |
|---|---|---|
| 6,794,469 B2 | 9/2004 | Obayashi |
| 6,852,399 B2 | 2/2005 | Takahashi |
| 6,899,944 B2 | 5/2005 | Tanaka |
| 6,905,754 B2 | 6/2005 | Jing |
| 7,727,436 B2 | 6/2010 | Weinert |
| 7,879,948 B2 | 2/2011 | Ogata |
| 8,030,430 B2 | 10/2011 | Fan |
| 8,147,966 B2 | 4/2012 | Klun |
| 8,404,073 B2 | 3/2013 | Chisaka |
| 2005/0192420 A1 | 9/2005 | Navarrini |
| 2005/0197444 A1 | 9/2005 | Kyte |
| 2008/0015298 A1 | 1/2008 | Xiong |
| 2009/0246439 A1 | 10/2009 | Kanno |
| 2012/0029140 A1 | 2/2012 | Chida |
| 2012/0196065 A1 | 8/2012 | Chen |
| 2012/0240973 A1 | 9/2012 | Buehne |
| 2012/0298196 A1 | 11/2012 | Nakagawa |
| 2013/0092217 A1 | 4/2013 | Gobou |
| 2013/0190456 A1 | 7/2013 | Hirano |
| 2013/0213468 A1 | 8/2013 | Nagato |

FOREIGN PATENT DOCUMENTS

| | | |
|---|---|---|
| EP | 0403573 | 12/1990 |
| EP | 1947144 | 7/2008 |
| EP | 2527397 | 11/2012 |
| JP | 3052958 | 7/1998 |
| JP | 2002-256203 | 9/2002 |
| JP | 2003-049111 | 2/2003 |
| JP | 2009-235338 A | 10/2009 |
| JP | 2010-182862 | 8/2010 |
| JP | 2011-516299 | 5/2011 |
| WO | WO 2010-076876 | 7/2010 |
| WO | WO 2011-019415 | 2/2011 |
| WO | WO 2013-123156 | 8/2013 |
| WO | WO 2013-157401 | 10/2013 |
| WO | WO 2014-055828 | 4/2014 |
| WO | WO 2014-100335 | 6/2014 |

* cited by examiner

STAIN RESISTANT MICROSPHERE ARTICLES

FIELD

This disclosure relates to stain resistant articles that are coated with microspheres.

BACKGROUND

Decorative protective surfaces find many consumer applications. Household appliances, automotive interiors and paints, consumer electronic devices, such as laptops and hand held devices, are all examples where consumers prefer materials that deliver considerable protection from stains, scratches, wear and abrasion while retaining cosmetic and aesthetic appeal through the material's lifecycle. Low gloss matte surfaces are of particular interest to many consumers because of their aesthetic appeal.

Durable decorative laminates and films comprised of glass beads are broadly known. These low gloss constructions typically consist of exposed glass bead surfaces that impart high durability and decorative properties to the construction. Low friction properties of such constructions have also been disclosed. For example, U.S. Pat. No. 4,849,265 (Ueda) discloses decorative abrasion resistant laminates that contain hard microspheres (glass or plastic) that are either exposed or surface coated with a thin polymer coating. Low friction properties of such constructions have also been disclosed.

Known methods for designing decorative materials comprised of glass beads include closely matching the refractive index of the individual components. It is also known that it is advantageous to select microspheres having a refractive index in a range that is close to that of commonly used polymer films, so as to minimize light reflected due to index mismatch. By reducing the overall front surface reflectance, a more true color of any underlying color layer can be realized when viewed through the glass bead layer. For example, U.S. Pat. No. 5,620,775 (LaPerre) discloses decorative articles comprising exposed glass bead surfaces, with glass beads having a refractive index in the range of about 1.5 to about 1.6, which is a refractive index range close to that of common polymers. Specifically, bead films and low coefficient of friction decorative bead films are known in the art, but bead films which are stain resistant to highly staining materials such as yellow mustard, blood, wine, etc., even at elevated temperature and humidity, that also exhibit low coefficient of friction, good abrasion resistance, and sufficient hardness have not been described previously.

There is a need for highly stain resistant bead films that have a low coefficient of friction, good abrasion resistance, and sufficient hardness. It would be further advantageous if such films were also thermoformable. It would be even more advantageous if such films exhibited resistance to organic solvents.

SUMMARY

The present disclosure provides stain resistant, bead films which are stain resistant to highly staining materials such as yellow mustard, blood, wine, etc., even at elevated temperature and humidity, and also exhibit a low coefficient of friction, good abrasion resistance, and sufficient hardness. In some embodiments such bead films are thermoformable. In some embodiments such bead films are resistant to organic solvents. The present disclosure provides resin systems that include fluoropolymers such as fluoroolefins and fluorourethanes. Fluoroolefins include elastomeric fluoroolefin polymers, thermoplastic fluoroolefin polymers, elastomeric fluoroolefin polymers crosslinked with multifunctional acrylates or multifunctional amines, and thermoplastic fluoroolefin polymers crosslinked with multifunctional amines. Fluorourethanes include fluorinated polyurethanes. Such resin systems may be employed in conjunction with additional resin layers such as polyurethanes including polyurethane dispersions, two part urethane (meaning the two components, isocyanate and hydroxyl compound, are combined at the time of coating) urethanes coated from solvent, and 100% solids two part urethanes.

In one aspect, the present invention provides an article comprising at least a first surface having: (a) a binder resin layer having a fluorine-containing polymer, wherein the binder resin layer has a first major surface opposite a second major surface; and (b) a plurality of microspheres partially embedded in, and adhered thereto, the first major surface of the binder resin layer; wherein the fluorine-containing polymer is derived in part from at least one partially fluorinated, or non-fluorinated, monomer; and wherein the article of embodiment exhibits a stain resistance to yellow mustard at elevated temperature and humidity as measured by the change in b* of less than 50.

In some embodiments, the plurality of microspheres is selected from at least one of glass, polymers, glass ceramics, ceramics, metals and combinations thereof. In some embodiments, the fluorine-containing polymer is selected from at least one of the following: fluoroolefins and fluorourethanes and combinations thereof.

In some embodiments, at least about 40% of the surface of the article is covered with the plurality of microspheres. In some embodiments, a reinforcing layer is formed on the second major surface of the binder resin layer. In some embodiments, the reinforcing layer is selected from one of the following: polyurethane resins, acrylic resins, polyester resins, epoxy resins. In some embodiments, the polyurethane resin is selected from polyurethane dispersions, two part urethanes coated from solvent, 100% solids two part urethanes, and combinations thereof.

In some embodiments, the fluorine content along the polymeric backbone of the fluorine-containing polymer is from about 27% to 72% by weight. In some embodiments, a substrate layer is disposed on a surface other than the first major surface of the binder resin layer.

In some embodiments, an adhesive layer is disposed on a surface other than the first major surface of the binder resin layer. In some embodiments, the fluorine-containing polymer is derived from aqueous dispersions of at least one partially fluorinated, or non-fluorinated, monomer.

In another aspect, the present disclosure provides an article comprising a first surface having: (a) a binder resin layer having a fluorine-containing polymer, wherein the binder resin layer has a first major surface opposite a second major surface; and (b) a plurality of microspheres partially and adhered thereto, the first major surface of the binder resin layer; wherein the fluorine-containing polymer is derived in part from at least one partially fluorinated, or non-fluorinated, monomer; and wherein the fluorine content along the polymeric backbone of the fluorine-containing polymer is from about 27% to 72% by weight.

In some embodiments, the plurality of microspheres is selected from at least one of glass, polymers, glass ceramics, ceramics, metals and combinations thereof. In some embodiments, the fluorine-containing polymer is selected from at least one of the following: fluoroolefins and fluorourethanes and combinations thereof.

In some embodiments, at least about 60% of the surface of the article is covered with the plurality of microspheres. In some embodiments, a reinforcing layer is formed on the second major surface of the binder resin. In some embodiments, the reinforcing layer is selected from one of the following: polyurethane resins, acrylic resins, polyester resins, epoxy resins. In some embodiments, the polyurethane resin is selected from polyurethane dispersions, two part urethanes coated from solvent, 100% solids two part urethanes, and combinations thereof.

In some embodiments, the article exhibits a stain resistance to yellow mustard at elevated temperature and humidity as measured by the change in b* of less than 50. In some embodiments, the article further comprises a substrate layer disposed on a surface other than the first major surface of the binder resin layer. In some embodiments, the article further comprises an adhesive layer disposed on a surface other than the first major surface of the binder resin layer.

In some embodiments, the article is thermoformable. In some embodiments, the article further comprises a layer having a glass transition temperature greater than or equal to 60° C. and less than or equal to 150° C.

In some embodiments, the article has a layer selected from polycarbonates thermoplastic polyurethanes, semicrystalline polyesters, and amorphous polyesters. In some embodiments, the article is resistant to organic solvents. In some embodiments, the fluorine-containing polymer is derived from aqueous dispersions of at least one partially fluorinated, or non-fluorinated, monomer.

In yet another aspect, the present disclosure provides an article comprising at least a first surface having: (a) a binder resin layer having a fluorine-containing polymer, wherein the binder resin layer has a first major surface opposite a second major surface; and (b) a plurality of microspheres partially embedded in, and adhered thereto, the first major surface of the binder resin layer; wherein the fluorine-containing polymer is derived in part from at least one partially fluorinated, or non-fluorinated, monomer; and wherein the article is a thermoformable article exhibiting chemical resistance according to ASTM D5402-06.

In some embodiments, the plurality of microspheres is selected from at least one of glass, polymers, glass ceramics, ceramics, metals and combinations thereof. In some embodiments, the fluorine-containing polymer is selected from at least one of the following: fluoroolefins and fluorourethanes and combinations thereof. In some embodiments, at least about 40% of the surface of the article is covered with the plurality of microspheres.

In some embodiments, the article further comprises a reinforcing layer formed on the second major surface of the binder resin layer. In some embodiments, the reinforcing layer is selected from one of the following: polyurethane resins, acrylic resins, polyester resins, epoxy resins. In some embodiments, the polyurethane resin is selected from polyurethane dispersions, two part urethanes coated from solvent, 100% solids two part urethanes, and combinations thereof.

In some embodiments, the fluorine content along the polymeric backbone of the fluorine-containing polymer is from about 27% to 72% by weight. In some embodiments, the article further comprises a substrate layer disposed on a surface other than the first major surface of the binder resin layer.

In some embodiments, the article further comprises an adhesive layer disposed on a surface other than the first major surface of the binder resin layer. In some embodiments, the article of embodiment exhibits a stain resistance to yellow mustard at elevated temperature and humidity as measured by the change in b* of less than 50. In some embodiments, the fluorine-containing polymer is derived from aqueous dispersions of at least one partially fluorinated, or non-fluorinated, monomer.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1A:
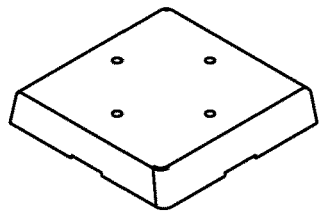
FIG. 1A illustrates an exemplary front perspective view of an article according to the present disclosure.

Before any embodiments of the invention are explained in detail, it is to be understood that the invention is not limited in its application to the details of construction and the arrangement of components set forth in the following description. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Any numerical range recited herein includes all values from the lower value to the upper value. For example, if a concentration range is stated as 1% to 50%, it is intended that values such as 2% to 40%, 10% to 30%, or 1% to 3%, etc., are expressly enumerated. These are only examples of what is specifically intended, and all possible combinations of numerical values between and including the lowest value and the highest value enumerated are to be considered to be expressly stated in this application.

The present disclosure provides articles having at least a first surface that includes a binder resin layer having a fluorine-containing polymer where the binder resin layer has a first major surface opposite a second major surface; and a plurality of microspheres partially embedded in the first major surface of the binder resin layer and adhered thereto. In some embodiments, it is preferred that the article is stain resistant. In order for the article to be stain resistant the materials in the article, such as the binder resin layer, must have certain properties.

First, when the article is exposed to highly staining agents, such as yellow mustard, blood, wine, etc. it must be resistant to the staining agent. If the article is not stain resistant then the decorative products to which it is applied may lose their aesthetic appeal even while retaining their functionality. However stain resistance under ambient conditions (e.g., 23° C. (73° F.) and 50% relative humidity) is insufficient. The decorative products to which the articles of the invention may be applied are often exposed to elevated temperatures and humidity. While many materials may provide adequate stain resistance at ambient conditions they often fail to provide sufficient stain resistance when exposed to more demanding environments for prolonged times, such as at 66° C. (150° F.) and 85% relative humidity for 72 hours. The term "decorative product" as used herein means articles that have a coefficient of retro reflection of less than or equal to 1.0 candelas/lux/square meter. In some preferred embodiments, the presently disclosed articles have a coefficient of retro reflection of less than or equal to 0.5 candelas/lux/square meter. In some more preferred embodiments, the presently disclosed articles have a coefficient of retro reflection of less than or equal to 0.1 candelas/lux/square meter.

When the article is exposed to highly staining agents it is necessary for the outer surface to be both resistant to discoloration at the surface as well as impervious to penetration into the subsurface by the staining agent.

While not wishing to be bound by theory, it is believed that any, or all, of surface energy, crystallinity, solubility parameters, crosslink density, and film surface continuity characteristics play a role in providing resistance to surface discoloration and/or subsurface penetration. While fluoropolymers are generally known to possess desirable properties that may improve stain resistance they are difficult to process and adhere to. It has now been found that certain fluorine-containing polymers may be suitably processed, and adhered to, to provide articles having a high degree of stain resistance. Unexpectedly, there was found to be a large variation in the degree of stain resistance exhibited by the various fluorine-containing materials evaluated. Thus not all fluorine-containing polymers are suitable for use in the present disclosure.

Other desired criterion for the article are a low coefficient of friction which affects the feel of the surface of the article and its aesthetic appeal, good abrasion resistance so as to be wear resistant, and sufficient hardness to resist deformation. Coefficient of friction values of 0.3 are desirable for some embodiments of the present disclosure. Abrasion resistance, as measured by a rotary Taber abraser and measuring the change in % haze, is desirably 10 or less, or 5 or less, or even 3.5 or less for some embodiments of the present disclosure. Pencil hardness values of, for example, of 3H at a force of 5 Newtons, or 1H at 7.5 Newtons, or harder, are desirable for some embodiments of the present disclosure.

Previously taught constructions have not combined stain resistance to highly staining materials at elevated temperatures and humidity with low coefficient of friction surface, pencil hardness characteristics, thermoformability and/or solvent resistance.

Transfer Carrier

The transfer coating method of the present disclosure can be used to form the presently disclosed microsphere transfer article from which can be formed the presently disclosed microsphere article. The microsphere article has a surprisingly improved aesthetics.

The presently disclosed transfer carrier includes a support layer and a thermoplastic release layer bonded thereto. The thermoplastic release layer of the transfer carrier temporarily partially embeds a plurality of transparent microspheres. The transfer carrier has low adhesion to the plurality of transparent microspheres and to the binder resin layer in which the opposite sides of the plurality of transparent microspheres are partially embedded, so that the transfer carrier can be removed to expose the surface of the plurality of transparent microspheres.

Support Layers

The support layer should be "dimensionally stable". In other words it should not shrink, expand, phase change, etc. during the preparation of the transfer article. Useful support layers may be thermoplastic, non-thermoplastic or thermosetting, for example. One skilled in the art would be able to select a useful support layer for the presently disclosed transfer article. If the support layer is a thermoplastic layer it should preferably have a melting point above that of the thermoplastic release layer of the transfer carrier. Useful support layers for forming the transfer carrier include but are not limited to those selected from at least one of paper and polymeric films such as biaxially oriented polyethylene terephthalate (PET), polypropylene, polymethylpentene and the like which exhibit good temperature and tensile stability so they can undergo processing operations such as bead coating, adhesive coating, drying, printing, and the like.

Thermoplastic Release Layers

Useful thermoplastic release layers for forming the transfer carrier include but are not limited to those selected from at least one of polyolefins such as polyethylene, polypropylene, organic waxes, blends thereof, and the like. Low to medium density (about 0.910 to 0.940 g/cc density) polyethylene is preferred because it has a melting point high enough to accommodate subsequent coating and drying operations which may be involved in preparing the transfer article, and also because it releases from a range of adhesive materials which may be used as the binder resin layer, in addition to the plurality of transparent microspheres.

The thickness of the thermoplastic release layer is chosen according to the microsphere diameter distribution to be coated. The binder resin layer embedment becomes approximately the complement image of the transfer carrier embedment. For example, a transparent microsphere which is embedded to about 30% of its diameter in the release layer of the transfer carrier is typically embedded to about 70% of its diameter in the binder resin layer. To maximize slipperiness and packing density of the plurality of microspheres, it is desirable to control the embedment process so that the upper surface of smaller microspheres and larger microspheres in a given population end up at about the same level after the transfer carrier is removed.

In order to partially embed the plurality of transparent microspheres in the release layer, the release layer should preferably be in a tacky state (either inherently tacky and/or by heating). The plurality of transparent microspheres may be partially embedded, for example, by coating a plurality of transparent microspheres on the thermoplastic release layer of the transfer carrier followed by one of (1)-(3): (1) heating the microsphere coated transfer carrier, (2) applying pressure to the microsphere coated transfer carrier (with, for example, a roller) or (3) heating and applying pressure to the microsphere coated transfer carrier.

For a given thermoplastic release layer, the microsphere embedment process is controlled primarily by temperature, time of heating and thickness of the thermoplastic release layer. As the thermoplastic release layer is melted, the smaller microspheres in any given population will embed at a faster rate and to a greater extent than the larger microspheres because of surface wetting forces. The interface of the thermoplastic release layer with the support layer becomes an embedment bounding surface since the microspheres will sink until they are stopped by the dimensionally stable support layer. For this reason it is preferable that this interface be relatively flat.

The thickness of the thermoplastic release layer should be chosen to prevent encapsulation of most of the smaller diameter microspheres so that they will not be pulled away from the binder resin layer when the transfer carrier is removed. On the other hand, the thermoplastic release layer must be thick enough so that the larger microspheres in the plurality of transparent microspheres are sufficiently embedded to prevent their loss during subsequent processing operations (such as coating with the binder resin layer, for example).

Microspheres

Microspheres useful in the present disclosure can be made from a variety of materials, such as glass, polymers, glass ceramics, ceramics, metals and combinations thereof. In some embodiments, the microspheres are glass beads. The glass beads are largely spherically shaped. The glass beads are typically made by grinding ordinary soda-lime glass or borosilicate glass, typically from recycled sources such as from glazing and/or glassware. Common industrial glasses could be of varying refractive indices depending on their composition. Soda lime silicates and borosilicates are some of the common types of glasses. Borosilicate glasses typically contain boria and silica along with other elemental oxides such as alkali metal oxides, alumina etc. Some glasses used in the industry that contain boria and silica among other oxides include E glass, and glass available under the trade designation NEXTERION GLASS D from Schott Industries, Kansas City, Mo., and glass available under the trade designation PYREX from Corning Incorporated, New York, N.Y.

In some embodiments, the microspheres useful in the present disclosure have a refractive index of less than about 1.60. In some embodiments, the microspheres have a refractive index of less than about 1.55. In some embodiments, the microspheres have a refractive index of less than about 1.53. In some embodiments, the microspheres have a refractive index of less than about 1.50. In some embodiments, the microspheres have a refractive index of less than about 1.47. In some embodiments, the microspheres have a refractive index of less than about 1.46.

The grinding process yields a wide distribution of glass particle sizes. The glass particles are spherodized by treating in a heated column to melt the glass into spherical droplets, which are subsequently cooled. Not all the beads are perfect spheres. Some are oblate, some are melted together and some contain small bubbles.

Microspheres are preferably free of defects. As used herein, the phrase "free of defects" means that the microspheres have low amounts of bubbles, low amounts of irregular shaped particles, low surface roughness, low amount of inhomogeneities, low amounts undesirable color or tint, or low amounts of other scattering centers.

Particle Sizing

The microspheres are typically sized via screen sieves to provide a useful distribution of particle sizes. Sieving is also used to characterize the size of the microspheres. With sieving, a series of screens with controlled sized openings is used and the microspheres passing through the openings are assumed to be equal to or smaller than that opening size. For microspheres, this is true because the cross-sectional diameter of the microsphere is almost always the same no matter how it is oriented to a screen opening. It is desirable to use as broad a size range as possible to control economics and maximize the packing of the microspheres on the binder layer surface. However, some applications may require limiting the microsphere size range to provide a more uniform microsphere coated surface. In some embodiments, a useful range of average microsphere diameters is about 5 µm to about 200 µm (typically about 35 to about 140 µm, preferably about 35 to 90 µm, and most preferably about 38 to about 75 µm). A small number (0 to 5% by weight based on the total number of microspheres) of smaller and larger microspheres falling outside the 20 to 180 micron range can be tolerated. In some embodiments, a multi-modal size distribution of microspheres is useful.

In some embodiments, to calculate the "average diameter" of a mixture of microspheres one would sieve a given weight of particles such as, for example, a 100 gram sample through a stack of standard sieves. The uppermost sieve would have the largest rated opening and the lowest sieve would have the smallest rated opening. For our purposed the average cross-sectional diameter can be effectively measure by using the following stack of sieves.

| U.S. Sieve Designation No. | Nominal Opening (microns) |
| --- | --- |
| 80 | 180 |
| 100 | 150 |
| 120 | 125 |
| 140 | 106 |
| 170 | 90 |
| 200 | 75 |
| 230 | 63 |
| 270 | 53 |
| 325 | 45 |
| 400 | 38 |

Alternately, average diameter can be determined using any commonly known microscopic methods for sizing particles. For example, optical microscopy or scanning electron microscropy, and the like, can be used in combination with any image analysis software. For example, software commercially available as free ware under the trade designation IMAGE J from NIH, Bethesda, Md.

Adhesion Promoter

In some embodiments, the microspheres are treated with an adhesion promoter such as those selected from at least one of silane coupling agents, titanates, organo-chromium complexes, and the like, to maximize their adhesion to the binder resin layer, especially with regard to moisture resistance.

The treatment level for such adhesion promoters is on the order of 50 to 1200 parts by weight adhesion promoter per million parts by weight microspheres. Microspheres having smaller diameters would typically be treated at higher levels because of their higher surface area. Treatment is typically accomplished by spray drying or wet mixing a dilute solution such as an alcohol solution (such as ethyl or isopropyl alcohol, for example) of the adhesion promoter with the microspheres, followed by drying in a tumbler or auger-fed dryer to prevent the microspheres from sticking together. One skilled in the art would be able to determine how to best treat the microspheres with an adhesion promoter.

Binder Resin Layer

The binder resin layer is typically a fluorine-containing organic polymeric material. The transparent microspheres are partially embedded in the first major surface of the binder resin layer and adhered thereto. The binder resin layer should exhibit good adhesion to the transparent microspheres themselves or to the treated microspheres. It is also possible that an adhesion promoter for the microspheres could be added directly to the binder resin layer itself as long as it is compatible within the process window for disposing the binder resin layer on the surfaces of the microspheres. It is important that the binder resin layer has sufficient release from the thermoplastic release layer of the transfer carrier to allow removal of the transfer carrier from the microspheres, which are embedded on one side in the thermoplastic release layer and on the other side in the binder resin layer. In the stain resistant articles of the present disclosure the exposed bead surfaces are not covered by the binder resin layer.

The binder resin layer of the present disclosure is selected such that the resulting articles exhibit stain resistance to yellow mustard at elevated temperature and humidity.

It has been surprisingly found that the fluorine-containing polymer of the binder resin layer be derived in part from at least one partially fluorinated, or non-fluorinated, monomer in order to exhibit the desired stain resistance characteristics. An example of a partially fluorinated component is vinylidene fluoride. It was unexpectedly found that the desired stain resistance properties did not necessarily correspond with those materials having the lowest surface energies.

Such stain resistance characteristics have also unexpectedly been found to be related to the amount and location of the fluorine atoms in the fluorine-containing polymer of the binder resin. This may be calculated by taking into account both the weight ratios of the monomers included as well as the fluorine content by weight of each monomer along its polymerizable chain length, including fluorine atoms that are present on those atoms once removed from the polymerizable chain. As an example, a copolymer of tetrafluoroethylene, hexafluoropropylene, and vinylidene fluoride in a weight ratio of 10:40:50 would have a backbone fluorine content of 67.7%. This was calculated as follows.

Tetrafluoroethylene: $C_2F_4$, molecular weight 100.01, monomeric fluorine content 76.0%, weight ratio 10%;

Hexafluoropropylene: $C_3F_6$, molecular weight 150.02, monomeric fluorine content 76.0%, weight ratio 40%;

Vinylidene fluoride: $C_2H_2F_2$, molecular weight 64.03, monomeric fluorine content 59.3%, weight ratio 50%.

$$(0.1 \times 0.76) + (0.4 \times 0.76) + (0.5 \times 0.593)] \times 100 = 67.7\%.$$

Note that this calculation includes the fluorine atoms on the trifluoromethyl group of hexafluoropropylene since it is only one atom removed from the polymerizable chain of the hexafluoropropylene monomer.

In some embodiments of the present disclosure the fluorine content along the polymeric backbone of the fluorine-containing polymer is from about 27% to about 72% by weight.

Although there may be fluorine-containing materials which possess the desired fluorine content they may not exhibit the desired level of stain resistance to highly staining materials, such as yellow mustard, at elevated temperature and humidity. Without wishing to be bound by theory, it is believed that those materials in which the fluorine atoms reside solely, or predominately, in pendent side chains or end group do not exhibit the desired stain resistance characteristics of the articles of the present disclosure. While materials in which the fluorine atoms reside solely, or predominately, in pendent side chains or end group may provide adequate stain resistance to yellow mustard at room temperature and humidity they have been found to not do so at elevated temperature and humidity.

In some embodiments, fluoropolymers having certain glass transition temperatures (Tg) are useful in the present disclosure. Without being bound by theory, it is believed that the higher the Tg, the more resistant it is to staining according to the methods disclosed herein. For example, in some embodiments, fluoropolymers having a Tg above 60° C. are useful in the present disclosure. In some embodiments, fluoropolymers having a Tg of less than or equal to 150° C. are useful in the present disclosure.

The fluorine-containing polymer of the binder resin is desirably coatable out of solvent or from an aqueous dispersion. Use of solvent coating or aqueous dispersions provides advantages such as lower processing temperatures which in turn permits the use of materials such as polyethylene in the transfer carrier. Lower process temperatures also generally result in decreased thermal stress in the final articles. In addition, the use of certain higher boiling solvents may advantageously provide articles with reduced amounts of entrapped air in the dried and cured binder resin layer.

In addition to being coatable from solvent or aqueous dispersions, the fluorine-containing materials of the binder resin layer desirably form a continuous film upon drying. Without being bound by theory, it is believed that film continuity, i.e., free of pinholes and other discontinuities, contributes to the resistance of the articles of the present disclosure to highly staining materials such as yellow mustard, blood, wine, etc. It is also believed that such film continuity contributes to enhanced mechanical properties as well as improving bead transfer from the transfer carrier to the binder resin layer.

It was also surprisingly found that for some embodiments of the present disclosure it was not necessary to employ a surface treatment prior to providing an optional reinforcing layer. Typically fluoropolymers are surface treated prior to bonding them to other materials. Such treatments include plasma, corona, and chemical etching, e.g., sodium etching.

Binder resins useful in the binder resin layer include fluorine-containing polymers including, but not limited, to those selected from at least one of the following: fluoroolefins and fluorourethanes. Fluoroolefins include elastomeric fluoroolefin polymers, thermoplastic fluoroolefin polymers, elastomeric fluoroolefin polymers crosslinked with multifunctional acrylates or multifunctional amines, and thermoplastic fluoroolefin polymers crosslinked with multifunctional amines. Fluorourethanes include crosslinked fluorinated polyurethanes. Any combination of these materials may also be used so long as they are miscible in one another. In some embodiments, fluorine-containing polymers useful in the present disclosure may also include other halogens, such as for, example chlorine. An exemplary fluorine-containing polymer useful in the present disclosure includes chloro trifluoroethylene (CTFE). Any combination of these materials may also be used so long as they are miscible in one another.

Examples of useful elastomeric fluoroolefin polymers include, but are not limited to, bromine-containing copolymers of tetrafluoroethylene, hexafluoropropylene, and vinylidene fluoride such as that available under the trade designation 3M DYNEON PEROXIDE CURE FLUOROELASTOMER FPO 3740 from 3M Company, St. Paul, Minn.; and ultra-low viscosity fluoropolymers such as that obtained as an experimental or developmental product under the trade designation 3M DYNEON FLUOROELASTOMER E-20575 from 3M Company, St. Paul, Minn. Examples of useful thermoplastic fluoroolefin polymers include, but are not limited to, copolymers of tetrafluoroethylene, hexafluoropropylene, and vinylidene fluoride such as that available under the trade designation 3M DYNAMAR POLYMER PROCESSING ADDITIVE FX 5912 from 3M Company, St. Paul, Minn. Examples of useful co-crosslinked fluoropolymers include, but are not limited to, elastomeric fluoroolefins co-reacted with multifunctional acrylates, such as pentaerythritol triacrylate, available under the trade designation SARTOMER SR 344 from Sartomer USA, LLC, Exton, Pa., and trimethylolpropane triacrylate, available under the trade designation SARTOMER SR 351H from Sartomer USA, LLC, Exton, Pa. may also be used. Examples of useful fluoropolymers crosslinked with amines include, but are not limited to, thermoplastic fluoroolefins reacted with multifunctional primary amines such as that available under the trade designation JEFFAMINE T403 from Huntsman Corporation, The Woodlands, Tex., and polyetherimines such as that obtained under the code number 32034100 from ACROS Organics, a subsidiary of Thermo Fisher Scientific, Minneapolis, Minn. A useful, non-limiting, example of a fluorourethane is that derived from the reaction of a polyfunctional, aliphatic isocyanate resin based hexamethylene diisocyanate (HDI), such as that available under the trade designation DESMODUR N3300A from Bayer Materials Science LLC, Pittsburgh, Pa. and a fluorinated polydroxy-containing polymer such as that available under the trade designation ZEFFLE GK 570 from Daikin America, Orangeburg, N.Y. In some embodiments, useful non-limiting examples of fluoropolymer include those derived from a solid, copolymer of fluoroethylene and vinyl ether available under the trade designation of LUMIFLON LF-200F from AGC Chemicals America, Exton, Pa.

CN 101314684 and CN 101319113, for example, disclose ZEFFLE GK 570 as having a fluorine content of 35-40%. JP 2010182862, for example, discloses ZEFFLE GK 570 as having a fluorine content of 35%. The forgoing documents are incorporated herein by reference in their entirety.

For the presently disclosed articles to be stain resistant and thermoformable, it is preferred that the binder resin layers are not crosslinked or are very lightly crosslinked Lightly crosslinked materials are preferred over highly crosslinked materials because they produce less elastic recovery energy after being deformed in the forming process. Also, lightly crosslinked materials tend to accommodate higher degrees of elongation before failing compared to highly crosslinked materials. In some embodiments, non-crosslinked materials are preferred to give very high degrees of elongation and to withstand deformation at very high temperatures without failing. In some embodiments, lightly crosslinked materials are preferred over non-crosslinked materials to give better resistance to chemicals as well as resistance to creep and other dimensional instability over time.

The binder resin layer may be transparent, translucent, or opaque. The binder resin layer may, for example, be clear and colorless or pigmented with opaque, transparent, or translucent dyes and/or pigments. In some embodiments, inclusion of specialty pigments, such as for example metallic flake pigments, can be useful.

If retroreflective performance is desired in at least a portion of the surface layer of the presently disclosed microsphere coated article, such that a reflecting layer (such as a thin metallic layer such as an aluminum flake ink layer, for example) is coated on the buried (non-exposed) side of the transparent microspheres, it is preferred that the binder resin layer be transparent and thin such that it maintains the contours of the transparent microspheres, so that it can also function as a spacing layer to focus the incident light on the reflecting layer placed below it.

The binder resin layer is typically formed on the transfer carrier after the transparent microspheres have been partially embedded in the release layer of the transfer carrier. The binder resin layer is typically coated over the partially embedded transparent microspheres by a direct coating process but could also be provided over the transparent microspheres via thermal lamination either from a separate carrier or by first forming the binder resin layer on a separate substrate from which it is subsequently transferred to cover the transparent microspheres.

In the presently disclosed transfer and microsphere coated articles, the plurality of transparent microspheres are typically disposed on the first major surface of the binder resin layer to provide sufficient pencil hardness and abrasion characteristics.

In some embodiments the binder resin layer is continuous such that there is no break either in the areas between, or beneath, the microspheres in the stain resistant articles of the invention. In another embodiment, the binder resin layer is continuous in the areas between the microspheres, although it may not be present beneath the microspheres in the stain resistant articles of the invention. In the latter embodiment the microspheres themselves are providing the desired stain resistant characteristics where the binder resin layer is absent.

Reinforcing Layers

The presently disclosed microsphere coated articles and transfer articles can optionally comprise one or more reinforcing layer(s). Examples of suitable reinforcing layers include polyurethanes resin systems, acrylic resin, polyester resins, and epoxy resins. Suitable polyurethane resin systems include, but are not limited to, those selected from at least one of: polyurethane dispersions, 2 part urethanes coated from solvent, and 100% solids 2 part urethanes. Suitable acrylic resin systems include, but are not limited to, those selected from UV-curable acrylic resin systems and thermally curable acrylic resin systems. Such systems may be solvent coated, aqueous dispersions, or hot melt coated. One suitable type of polyester resin is co-amorphous polyester resins. Suitable epoxy resin systems include, but are not limited to, those selected from at least one of two part and one part epoxy resins. Such reinforcing layers may be formed on the surface of the binder resin layer opposite that of the bead-containing transfer carrier. The reinforcing layer can serve to provide advantageous handling characteristics, and in doing so permit the use of thinner layers of binder resin.

Substrate Layers

The presently disclosed microsphere coated articles and transfer articles can optionally comprise one or more substrate layer(s). Examples of suitable substrate layers include but are not limited to those selected from at least one of fabrics (including synthetics, non-synthetics, woven and non-woven such as nylon, polyester, etc.), polymer coated fabrics such as vinyl coated fabrics, polyurethane coated fabrics, etc.; polymeric matrix composites; leather; metal; paint coated metal; paper; polymeric films or sheets such as acrylics, polycarbonate, polyurethanes such as thermoplastic polyurethanes, polyesters including amorphous or semi-crystalline polyesters such as polyethylene terephthalate, elastomers such as natural and synthetic rubber, and the like. The substrates may, for example, be in the form of a clothing article; automobile, marine, or other vehicle seat coverings; automobile, marine, or other vehicle bodies; orthopedic devices; electronic devices, hand held devices, household appliances, and the like. Substrates layers useful herein include clear, white and colored materials, such as, for example, black colored materials.

The present disclosure also provides stain resistant articles which are thermoformable or stretchable. In order for the article to be thermoformable or stretchable, the materials in the article must have certain properties.

First, when the article is formed, the article must retain its formed dimensions. If the article has high elasticity, it can recover when the forming stresses are removed, essentially undoing the forming step. Therefore, high elasticity can be problematic. This issue can be avoided by using materials that undergo melt flow at or near the forming or stretching temperature. In other cases, a component of the article can have elasticity at the forming temperature, but this elasticity is likely to exert a recovery force after forming. To prevent this elastic recovery, the elastic layer can be laminated with a material that does not show this elasticity. For example, this inelastic material can be a thermoplastic material.

The other criterion for the article to be thermoformable is that it can bear the elongation that occurs during forming or stretching without failing, cracking, or generating other defects. This can be achieved by using materials that have a temperature at which they undergo melt flow and conducting the forming step near that temperature. In some cases, crosslinked materials that do not flow can be used, but they are more likely to crack during the elongation. To avoid this cracking, the crosslink density should be kept low, as can be indicated by a low storage modulus in the rubbery plateau region. The expected degree of crosslinking can also approximated as the inverse of the average molecular weight per crosslink, which can be calculated based on the components of a material. In addition, it is preferred to do the forming at relatively low temperatures, since as temperatures increase above the glass transition temperature of crosslinked materials, their capacity for elongation begins to decrease.

Thermoformable materials suitable for use in articles of the present disclosure include polycarbonate, polyurethanes such as thermoplastic polyurethanes, and polyesters including amorphous or semi-crystalline polyesters such as polyethylene terephthalate.

Graphic Layer Options

The present disclosed binder resin layer can optionally also perform the function of acting as the adhesive for a desired substrate and/or further comprise pigment(s) such that it also has a graphic function.

The binder resin layer, when selected to function also as a substrate adhesive graphic image, may be, for example, pigmented and provided in the form of an image, such as, for example, by screen printing the binder resin in the form of a graphic for transfer to a separate substrate. However, the binder resin layer, in some instances, is preferably colorless and transparent so that it can allow transmission of color from either a substrate, separate graphic layers (discontinuous colored polymeric layers) placed below it, or from a separate substrate adhesive that is optionally colored and optionally printed in the form of a graphic image (a discontinuous layer).

Typically, if a graphic image is desired it is provided separately on the surface of the binder resin layer opposite the plurality of transparent microspheres by at least one colored polymeric layer. The optional colored polymeric layer may, for example, comprise an ink Examples of suitable inks for use in the present disclosure include but are not limited to those selected from at least one of pigmented vinyl polymers and vinyl copolymers, acrylic and methacrylic copolymers, urethane polymers and copolymers, copolymers of ethylene with acrylic acid, methacrylic acid and their metallic salts, and blends thereof. The colored polymeric layer, which can be an ink, can be printed via a range of methods including, but not limited to screen printing, flexographic printing, offset printing, lithography, transfer electrophotography, transfer foil, and direct or transfer xerography. The colored polymeric layer may be transparent, opaque, or translucent.

If retroreflective performance is desired, the colored polymeric layer or multiple colored polymeric layers should be thin enough to maintain the contour of the plurality of transparent microspheres. The last underlying layer should be a reflecting layer such as a polymeric layer containing nascent reflecting particles such as aluminum flake or a metallic layer such as vapor deposited aluminum. The resultant graphic image could be a combination of individual retroreflective and non-retroreflective images when opaque colored polymeric layers are printed in some areas and reflecting colored polymeric layers are printed in other areas. The graphic could encompass a broad range of color, especially if a 4-color graphic process is employed.

A colored polymeric layer(s) may be included in the articles of the present disclosure by a number of procedures. For example, a transfer carrier can have a layer of transparent microspheres embedded in the release layer thereof, following which the microsphere embedded surface of the release layer is coated with a transparent layer of binder. This microsphere and adhesive coated transfer carrier can function as a casting liner by coating, for example, a continuous colored plasticized vinyl layer over the binder resin layer and wet laminating a woven or non-woven fabric thereover.

Another method involves providing graphic layers (discontinuous colored polymeric layers, for example) on the binder resin layer prior to casting a continuous colored plasticized vinyl layer to approximate the image of leather, for example.

Optional Adhesive Layer(s)

The presently disclosed microsphere coated article and transfer article may each optionally further comprise one or more adhesive layers. A substrate adhesive layer, for example, may optionally be included in the article in order to provide a means for bonding the binder layer or the layer(s) of material optionally bonded to the binder layers to a substrate. A substrate adhesive layer (as well as any other optional adhesive layers) may be selected from those generally known in the art such as, for example, pressure sensitive adhesives, moisture curing adhesives, and hot melt adhesives (i.e. those applied at elevated temperatures). Examples of such materials, include, for example, (meth) acrylics, natural and synthetic rubbers including block copolymers, silicones, urethanes, and the like. However, each adhesive layer used must be selected such that it will adhere the desired layers together. For example, a substrate adhesive layer must be selected such that it can adhere to an intended substrate as well as to the other layer to which it is bonded.

The optional adhesive layer, when present, may be continuous in some embodiments or discontinuous in some embodiments. Typically, the substrate layer, when present, is continuous, although it may be discontinuous. By continuous it is meant that within the outermost boundaries of the adhesive layer there are no areas left uncovered by the adhesive layer. Discontinuous means there may be areas present that are not covered by the adhesive layer. Such adhesive layers may be disposed on a surface opposite that of the first major surface of the binder resin layer.

Stain resistant, articles of the present disclosure may comprise a binder resin layer only, or a binder resin layer in combination with one or more of a reinforcing layer, substrate layer, graphic layer, or adhesive layer.

In the stain resistant articles of the present disclosure the substrate layers, graphic layers, and adhesive layers, when present, may be disposed on a surface other than the first major surface of the binder resin layer. For example, such stain resistant articles may comprise a binder resin layer having a first and second major surface, a plurality of microspheres partially embedded in, and adhered thereto, the first major surface of the binder resin layer, a reinforcing layer having a first and second major surface which is formed with its' first major surface in contact with the second major surface of the binder resin layer, an adhesive layer having a first and second major surface with its' first major surface in contact with the second major surface of the reinforcing layer, and a substrate layer having a first and second major surface with its' first major surface in contact with the second major surface of the adhesive layer. Alternatively, the adhesive layer may be absent and the first major surface of the substrate layer may be in contact with the second major surface of the reinforcing layer.

Surface Treatment

The binder resin layer may be treated by e-beam to provide crosslinking of the binder resin layer. Such crosslinking may improve the resistance of the binder resin layer to organic solvents. Such ebeaming may be done to either, or both, major surfaces of the binder resin layer. In addition, it may or may not be done through intervening layers. The surface of the binder resin layer opposite that of the bead-containing transfer carrier may be treated to provide improved bonding to the various other layers described herein. Such treatments include, but are not limited to, corona treatment, plasma treatment, chemical etching, and the like.

For some applications, it can be desirable to obtain specific bead surface area coverage. In some embodiments, at least about 40% of the surface of the article is covered with the plurality of microspheres. In some embodiments, at least about 60% of the surface of the article is covered with the plurality of microspheres. In some embodiments, the article has at least a portion of a first major surface covered with the plurality of microspheres with coverage greater than or equal to 30% of that portion of the first major surface. In some embodiments, the article has at least a portion of a first major surface covered with the plurality of microspheres with coverage less than or equal to 50% of that portion of the first major surface. In some embodiments, the percent of area covered by microspheres in one area of the film can be one coverage density, such as about 71%. In some embodiments, the percent of area covered by microspheres in another area of the film can be the same or different coverage density, such as 47%. In some embodiments, the percent of area covered by microspheres in yet another area of the film can be the same or different coverage density, such as 44%. In some embodiments, the presently disclosed articles include a plurality of microspheres that are substantially uniformly spaced.

A non-limiting list of exemplary embodiments and combinations of exemplary embodiments of the present disclosure are disclosed below:

1. An article comprising at least a first surface having:
   (a) a binder resin layer having a fluorine-containing polymer, wherein the binder resin layer has a first major surface opposite a second major surface; and
   (b) a plurality of microspheres partially embedded in, and adhered thereto, the first major surface of the binder resin layer;
   wherein the fluorine-containing polymer is derived in part from at least one partially fluorinated, or non-fluorinated, monomer; and
   wherein the article of embodiment exhibits a stain resistance to yellow mustard at elevated temperature and humidity as measured by the change in b* of less than 50.

2. The article of embodiment 1 wherein the plurality of microspheres are selected from at least one of glass, polymers, glass ceramics, ceramics, metals and combinations thereof.

3. The article of either the preceding embodiments wherein the fluorine-containing polymer is selected from at least one of the following: fluoroolefins and fluorourethanes and combinations thereof.

4. The article of any of the preceding embodiments wherein at least about 40% of the surface of the article is covered with the plurality of microspheres.

5. The article of any of the preceding embodiments further comprising a reinforcing layer formed on the second major surface of the binder resin layer.

6. The article of embodiment 5 wherein the reinforcing layer is selected from one of the following: polyurethane resins, acrylic resins, polyester resins, epoxy resins.

7. The article of embodiment 6 wherein the polyurethane resin is selected from polyurethane dispersions, two part urethanes coated from solvent, 100% solids two part urethanes, and combinations thereof.

8. The article of any of the preceding embodiments wherein the fluorine content along the polymeric backbone of the fluorine-containing polymer is from about 27% to 72% by weight.

9. The article of any of the preceding embodiments further comprising a substrate layer disposed on a surface other than the first major surface of the binder resin layer.

10. The article of any of the preceding embodiments further comprising an adhesive layer disposed on a surface other than the first major surface of the binder resin layer.

11. The article of any of the preceding embodiments wherein the fluorine-containing polymer is derived from aqueous dispersions of at least one partially fluorinated, or non-fluorinated, monomer.

12. An article comprising a first surface having:
   (a) a binder resin layer having a fluorine-containing polymer, wherein the binder resin layer has a first major surface opposite a second major surface; and
   (b) a plurality of microspheres partially and adhered thereto, the first major surface of the binder resin layer;
   wherein the fluorine-containing polymer is derived in part from at least one partially fluorinated, or non-fluorinated, monomer; and
   wherein the fluorine content along the polymeric backbone of the fluorine-containing polymer is from about 27% to 72% by weight.

13. The article of the embodiment 12 wherein the plurality of microspheres are selected from at least one of glass, polymers, glass ceramics, ceramics, metals and combinations thereof.

14. The article of embodiment 12 or 13 wherein the fluorine-containing polymer is selected from at least one of the following: fluoroolefins and fluorourethanes and combinations thereof.

15. The article of any of embodiments 12, 13, or 14 wherein at least about 60% of the surface of the article is covered with the plurality of microspheres.

16. The article of any of embodiments 12, 13, 14 or 15 further comprising a reinforcing layer formed on the second major surface of the binder resin 17. The article of embodiment 16 wherein the reinforcing layer is selected from one of the following: polyurethane resins, acrylic resins, polyester resins, epoxy resins.

18. The article of embodiment 17 wherein the polyurethane resin is selected from polyurethane dispersions, two part urethanes coated from solvent, 100% solids two part urethanes, and combinations thereof.

19. The article of any of embodiments 12 to 18 wherein the article of embodiment exhibits a stain resistance to yellow mustard at elevated temperature and humidity as measured by the change in b* of less than 50.

20. The article of any of embodiments 12 to 19 further comprising a substrate layer disposed on a surface other than the first major surface of the binder resin layer.

21. The article of any of embodiments 12 to 20 further comprising an adhesive layer disposed on a surface other than the first major surface of the binder resin layer.

22. The article of any of the preceding embodiments wherein the article is thermoformable.

23. The article of embodiment 22 comprising a layer having a glass transition temperature greater than or equal to 60° C. and less than or equal to 150° C.

24. The article of embodiment 23 having a layer selected from polycarbonates thermoplastic polyurethanes, semicrystalline polyesters, and amorphous polyesters.

25. The article of any of the preceding embodiments wherein the article is resistant to organic solvents.

26. The article of any of embodiments 12 to 25 wherein the fluorine-containing polymer is derived from aqueous dispersions of at least one partially fluorinated, or non-fluorinated, monomer.

27. An article comprising at least a first surface having:
(a) a binder resin layer having a fluorine-containing polymer, wherein the binder resin layer has a first major surface opposite a second major surface; and
(b) a plurality of microspheres partially embedded in, and adhered thereto, the first major surface of the binder resin layer;
wherein the fluorine-containing polymer is derived in part from at least one partially fluorinated, or non-fluorinated, monomer; and
wherein the article is a thermoformable article exhibiting chemical resistance according to ASTM D5402-06.

28. The article of embodiment 27 wherein the plurality of microspheres are selected from at least one of glass, polymers, glass ceramics, ceramics, metals and combinations thereof.

29. The article of embodiment 27 or 28 wherein the fluorine-containing polymer is selected from at least one of the following: fluoroolefins and fluorourethanes and combinations thereof.

30. The article of any of embodiments 27 to 29 wherein at least about 40% of the surface of the article is covered with the plurality of microspheres.

31. The article of any of any of embodiments 27 to 30 further comprising a reinforcing layer formed on the second major surface of the binder resin layer.

32. The article of embodiment 31 wherein the reinforcing layer is selected from one of the following: polyurethane resins, acrylic resins, polyester resins, epoxy resins.

33. The article of embodiment 32 wherein the polyurethane resin is selected from polyurethane dispersions, two part urethanes coated from solvent, 100% solids two part urethanes, and combinations thereof.

34. The article of any of embodiments 27 to 33 wherein the fluorine content along the polymeric backbone of the fluorine-containing polymer is from about 27% to 72% by weight.

35. The article of any of embodiments 27 to 34 further comprising a substrate layer disposed on a surface other than the first major surface of the binder resin layer.

36. The article of any of embodiments 27 to 35 further comprising an adhesive layer disposed on a surface other than the first major surface of the binder resin layer.

37. The article of any of embodiments 27 to 36 wherein the article of embodiment exhibits a stain resistance to yellow mustard at elevated temperature and humidity as measured by the change in b* of less than 50.

38. The article of any of embodiments 27 to 37 wherein the fluorine-containing polymer is derived from aqueous dispersions of at least one partially fluorinated, or non-fluorinated, monomer.

Various modifications and alterations of this invention will become apparent to those skilled in the art without departing from the scope and spirit of this invention.

EXAMPLES

| Materials | |
|---|---|
| Designation | Description |
| FP1 | A peroxide cure, bromine-containing fluoroelastomer based on a copolymer of tetrafluoroethylene, hexafluoropropylene, and vinylidene fluoride having a fluorine content of 69.5%, a specific gravity of 1.9, and a Mooney viscosity of 38 at 121° C., available under the trade designation 3M Dyneon PEROXIDE CURE FLUOROELASTOMER FPO 3740 from 3M Company, St. Paul, MN. |
| FP2 | A free-flowing, granular, fluorothermoplastic processing aid having a melting point of 110-126° C. and based on a copolymer of tetrafluoroethylene, hexafluoropropylene, and vinylidene fluoride, available under the trade designation 3M DYNAMAR POLYMER PROCESSING ADDITIVE FX 5912 from 3M Company, St. Paul, MN. |
| FP3 | A peroxide curable, ultra low viscosity (ULV) fluoroelastomer dipolymer having a fluorine content of 66%, a specific gravity of 1.80, and a Mooney viscosity of 100° C. of 3.5, obtained as an experimental or developmental product under the trade designation 3M Dyneon FLUOROELASTOMER E-20575 from 3M Company, St. Paul, MN. |

-continued

Materials

| Designation | Description |
|---|---|
| FP 4 | A fluoroelastomer copolymer of chlorotrifluoroethylene and 1,1-difluoroethylene, available under the trade designation KEL-F 3700Z from 3M Dyneon, Saint Paul, MN and including pendent fluorine atoms or fluorine atoms in the end groups. |
| FP5 | A 31% solids (w:w), aqueous dispersion of fluorine-containing terpolymer of tetrafluoroethylene:hexafluoropropylene:vinylidene fluoride/ 45:19:36 (w:w:w), described as terpolymer C-2 in Example 4 of U.S. Pat. No. 6,610,807, and prepared generally as disclosed in Example 1 of that patent. |
| FPUA 1 | A hexafluoropropylene oxide-based urethane polyacrylate prepared as described in Example 5.2 in U.S. Pat. No. 8,147,966, incorporated herein by reference, with the following modification: 90 mole percent of pentaerythritol triacrylate was used. This is referred to herein as a fluoropolymer urethane acrylate or FPUA 1 and includes pendent fluorine atoms or fluorine atoms in the end groups. |
| FPUA 2 | A 26 to 28 wt % solids, water-based, white colored emulsion of a methacrylate polymer and a fluoroacrylate modified aliphatic urethane having a pH of 4.0 to 7.0, available under the trade designation 3M STAIN RESISTANT ADDITIVE AND SEALER SRA 270 from 3M Company, Saint Paul, MN. This is referred to herein as a fluoropolymer urethane acrylate or FPUA 2 and includes pendent fluorine atoms or fluorine atoms in the end groups. |
| Polyester resin 1 | A solvent borne, linear, amorphous co-polyester resin having a glass transition temperature of 50° C. and a number average molecular weight (Mn) of 32,000 in THF, available under the trade designation SKYBON ES-240 from SK USA, Incorporated, Fort Lee, NJ. |
| Polyester resin 2 | A solvent borne, linear, amorphous co-polyester resin having a glass transition temperature of 50° C. and a number average molecular weight (Mw) of 67,000, available under the trade designation VITEL 2700B from Bostik Inc, Wauwatosa, WI. |
| Polyester resin 3 | A solvent borne, linear, amorphous co-polyester resin having a glass transition temperature of 50° C. and a number average molecular weight (Mw) of 50,000 available under the trade designation VITEL 2700 BLMW from Bostik Inc, Wauwatosa, WI. |
| PI | A liquid UV photoinitiator, ethyl-2,4,6-trimethylbenzoylphenylphosphinate, available under the trade designation TPO-L from BASF Corporation, Charlotte, NC. |
| TA1 | Pentaerythritol triacrylate having a functionality of 3, a molecular weight of 298, and a glass transition temperature of 103° C.; available under the trade designation SARTOMER SR 444 from Sartomer USA, LLC, Exton, PA. |
| TA2 | Trimethylolpropane triacrylate having a functionality of 3, a molecular weight of 296, and a glass transition temperature of 62° C., available under the trade designation SARTOMER SR 351H from Sartomer USA, LLC, Exton, PA. |
| SXL | An aqueous solution of an aminoalkyl siloxane having a chemical structure of $(H_2NCH_2CH_2CH_2SiO_{1.5})_n$, available under the trade designation SILQUEST A1106 from Momentive Performance Materials Incorporated, Houston, TX. |
| Epoxy 1 | An undiluted clear difunctional bisphenol A/epichlorohydrin derived liquid epoxy resin having an equivalent weight of 185-192 and a viscosity at 25° C. of 110-150 Poise, available under the trade designation EPON Resin 828 from Momentive Specialty Chemicals, Incorporated, Houston, TX. |
| Amine 1 | A difunctional, primary amine based on repeating oxypropylene units in the backbone, with an average molecular weight of about 230, a total amine content of 8.1 to 8.7 meq/gram, and having primary amine groups located on secondary carbon atoms at the end of the aliphatic polyether chain, available under the trade designation JEFFAMINE D230 from Huntsman Corporation, The Woodlands, TX. |
| Amine 2 | A trifunctional, primary amine based on repeating oxypropylene units in the backbone, with an average molecular weight of about 440, a total amine content of 6.1 to 6.6 meq/gram and having primary amine groups located on secondary carbon atoms at the end of the aliphatic polyether chain, available under the trade designation JEFFAMINE T403 from Huntsman Corporation, The Woodlands, TX. |
| Amine 3 | A 37 wt % solids aqueous solution of a polyetherimine (80 wt % ethoxylated), having a molecular weight of 50,000 (corresponding to CAS No. 26658-46-8), obtained under the code number 32034100from ACROS Organics, a subsidiary of Thermo Fisher Scientific, Minneapolis, MN |
| ICN 1 | A solvent free, polyfunctional, aliphatic isocyanate resin based hexamethylene diisocyanate (HDI) having an equivalent weight of approximately 193, an NCO content of 21.8%, and a monomeric HDI content of 0.2% maximum, available under the trade designation |

Materials -continued

| Designation | Description |
|---|---|
| | DESMODUR N3300A from Bayer Materials Science LLC, Pittsburgh, PA. |
| ICN 2 | A liquid cycloaliphatic diisocyanate, dicyclohexylmethane diisocyanate, having an equivalent weight of 132 maximum, an NCO content of 31.8% minimum, and a solidification point of 25° C., available under the trade designation DESMODUR W from Bayer Materials Science LLC, Pittsburgh, PA. |
| ICN 4 | A liquid, aliphatic polyisocyanate having an average equivalent weight of 382, an isocyanate content of 11% by weight, and a monomer HDI content of 0.3% maximum, available under the trade designation DESOMODUR N3800 from Bayer Materials Science LLC, Pittsburgh, PA. |
| ICN 5 | A liquid, solvent free, low viscosity, aliphatic polyisocyanate resin based on hexamethylene diisocyanate (HDI), having an average equivalent weight of 193, an isocyanate content of 21.8% by weight, and a monomer HDI content of 0.5% maximum, available under the trade designation DESOMODUR N3400 from Bayer Materials Science LLC, Pittsburgh, PA. |
| ICN 6 | A 70% solids solution in n-butyl acetate of a cycloaliphatic polyisocyanate based on isophorone diisocyanate (IPDI) having an isocyanate functionality of between 3 and 4, an NCO content of 12.0% and 0.5% by weight of IPDI monomer or less, available under the trade designation VESTANAT T 1890 E from Evonik Corporation, Parsipany, NJ. |
| POH 1 | A liquid aliphatic polyester polyol, having a hydroxyl number of 230 and a hydroxyl equivalent weight of 244, available under the trade designation K-FLEX 188 from King Industries Specialty Chemicals,, Norwalk, CT. |
| POH 2 | Polytetramethylene ether glycol, a waxy solid having a molecular weight of 625-675, a hydroxyl number of 166-180, and a melting point of 11-19° C., available under the trade designation TERATHANE 650 from Invista, Wichita, KS. |
| POH 3 | A liquid diol having a molecular weight of 90 and a boiling point of 23° C., available as 1,4-butanediol from Chemtura Corporation, Middlebury, CT. |
| FPOH 1 | A 65% solids solution in n-butyl acetate of a copolymer of tetrafluoroethylene and vinyl monomers, having a hydroxyl value of 55-65 mg KOH/gram for the solid resin which is suitable for reaction with isocyanates, available under the trade designation ZEFFLE GK 570 from Daikin America, Orangeburg, NY. This is believed to contain 35-40% fluorine by weight. |
| FPOH 2 | Di(2-hydroxyethyl)-perfluorobutyl sulfonamide, a C4F9 diol prepared as described in Example 10 of U.S. Pat. No. 3,734,962, incorporated herein by reference, and as follows: 0.2 mole of perfluorobutyl sulfonamide were reacted as described above with 0.44 mol of ethylene glycol carbonate and 57 g (68% of theory) of the compound $C_4F_9SO_2N(CH_2CH_2OH)$ B.P.$_{0.3\ mm}$ approximately 135° C., were isolated. The product was identified by the IR spectrum and by the $^1H$ and $^{15}F$ nuclear resonance spectrum. |
| FPOH 3 | A solid, copolymer of fluoroethylene and vinyl ether having glass transition of 35° C., a hydroxyl content of 49 mg KOH/gram resin, available under the trade designation of LUMIFLON LF-200F from AGC Chemicals America, Exton, PA. |
| T12 | Dibutyltin dilaurate (DBTDL), a liquid catalyst, available under the trade designation DABCO T-12 from Air Products and Chemicals, Incorporated, Allentown, PA. |
| Additive 1 | A dispersion containing 56 weight % of titanium dioxide pigment (Pigment White 6) in POH 1, available as 34W834 TiO2 POLYESTER DISPERSION from Penn Color, Incorporated, Doylestown, PA. |
| Additive 2 | A mixture of 0.1060 grams of a dispersion containing 14 weight % of Pigment Blue 60 in POH 2, available as 34S852 BLUE POLYOL DISPERSION from Penn Color, Incorporated, Doylestown, PA, was combined with 10.64 grams POH 1. |
| Additive 3 | A viscous liquid, non-ionic polymeric fluorochemical surfactant having a glass transition temperature of less than 0° C., a pH of 4.5, available under the trade designation 3M ™ NOVEC FLUOROSURFACTANT FC 4430 from 3M Company, Saint Paul, MN. |
| MEK | methyl ethyl ketone |
| IPA | isopropyl alcohol |
| MAK | methyl amyl ketone |
| Borosilicate glass microspheres | Type 1 borosilicate glass microsphere beads having an average size in the range of 38-75 micrometers, a refractive index of 1.47 as |

Materials (continued)

| Designation | Description |
|---|---|
| | determined by the standard Becke line method, and a density of 2.23 g/cc, obtained from Mo Sci Incorporated, Rolla, MO. |
| Borosilicate glass powder | Milled borosilicate glass powder having a size distribution of less than 200 mesh and density of 2.23 g/cc, available as PYREX ® 7740 from Strategic Materials Incorporated, Houston TX. |
| Soda lime silicate microspheres | Silane treated soda lime silicate microsphere beads having an average size in the range of 44-53 micrometers, a refractive index of 1.52 as determined by the standard Becke line method, and a density of 2.52 g/cc, obtained from Swarco Industries, Incorporated, Columbia, TN. |
| PET 1 | A clear, amorphous, copolyester film having a nominal thickness of 0.13 mm (0.005 inches) and a glass transition temperature of 80° C. (DSC), available under the trade designation PACUR PETg Copolyester Sheet from PACUR, LLC, Oshkosh, WI. |
| PC | A clear polycarbonate film having a glass transition temperature of 153° C., available under the trade designation LEXAN 8010 from SABIC Innovative Plastics, Pittsfield, MA. |
| PCPBT | An extrusion film based on a blend of polycarbonate (available under the trade designation MAKROLON from Bayer MaterialScience LLC, South Deerfield, MA) and polyester (polybutyl terephthalate) having a surface on one side of fine velvet and on the other side of very fine matte for printability, a thickness of 0.178 mm (0.007 inches), a tensile strength (break) of 55.8 MPa (8100 psi), and a tensile elongation (break) of 125%, available under the trade designation BAYFOL CR 6-2 000000 from Bayer MaterialScience LLC. Prior to use the film was plasma treated generally as described in U.S. Pat. No. 8,634,146 at column 13, line 65 to column 14, line 30, with the following modifications: The width of the drum electrode was 42.5 in. (108 cm); the tetramethyl silane deposition step was not employed; during the treatment step 1000 standard cubic centimeters of nitrogen was used in place of oxygen, and the operating pressure was 90 milliTorr, and a plasma treatment time of 30 seconds. |
| DEGME | Diethylene glycol monoethyl ether, available under the trade designation CARBITOL Solvent from Dow Chemical Company, Midland, MI. |
| DPGBE | Dipropylene glycol n-butyl ether, available under the trade designation DOWANOL DPnB from Dow Chemical Company, Midland, MI. |
| Clay | A natural bentonite clay having a typical dry particle size of less than 25 micrometers and a density of 2.86 grams/cc, available under the trade designation CLOSITE NA+ from BYK-Chemie GmbH, Wesel, Germany. |

Test Methods
Stain Resistance—Mustard

Free standing bead films, as well as laminates and thermoformed laminates made therefrom, were labeled and provided with a circle having diameter of 5.08 cm (2 inches) on their backside (i.e., opposite the exposed bead surface) using a permanent marking pen. A sheet of white bond paper was placed under the sample and a Hunter Labs MiniScan EZ spectrophotometer (Model #4500L, Hunter Associates Laboratory, Incorporated, Reston, Va.) was used to measure the L*, a*, and b* in the center of the circle from the frontside (i.e., surface having the exposed beads) of the film or laminate. Next, French's 100% Natural Classic Yellow Mustard was applied and uniformly distributed on the front side of the film within the boundary of the circle using a cotton swab. Samples prepared in this manner were placed in a heat and humidity chamber at a temperature of 66° C. (150° F.) and a relative humidity of 80% for a time of 72 hours. Upon removal from the chamber the films were rinsed with warm water and wiped with a paper towel to remove the remaining material from the test surface. Care was taken not to rupture the film during this process. After drying, L*, a*, and b* were measured as before and the change in the b* value was reported. The b* parameter was selected since it is a measure of the blue-yellow as defined in the CIE (International Commission on Illumination) 1976 Color Space. Values of 50 or less, or 30 or less, or even 20 or less are desirable.

For thermoformed samples mustard staining was conducted in the center of the raised top of the thermoformed article. The white bond paper was placed against the underside of the raised top surface.

Coefficient of Friction Testing

Free-standing bead films, as well as laminates and thermoformed laminates made therefrom, were evaluated for coefficient of friction using a table top peel tester. A 3.2 mm (0.013 inch) thick elastomeric foam having a density of about 0.25 g/cc was bonded to a flat steel substrate measuring 63.5 mm (2.5 inches) square, having a thickness of about 6 mm (0.024 inches), and weighing approximately 200 grams including the foam. Next, a free-standing bead film having a length of 63.5 mm (2.5 inches) that was approximately 5 mm longer than the substrate was place over the foam covered surface of the substrate such that the film was wrapped around the leading edge of the substrate. A hole was cut in the film to accommodate the pin by which the substrate was pulled during testing. This test article was placed with the film side down on an isopropyl alcohol wiped glass surface measuring at least 15.2 cm by 25.4 cm (6 inches by 10 inches). A table top peel tester was used in the coefficient of friction mode to pull the test article across the glass surface at a rate of about 2.29 meters/minute (90 inches/minute) for at least about 5 seconds. The transducer was calibrated with the force from the weight of the steel substrate with foam as 1.00. In this way pulling forces were directly read out as coefficient of friction (COF). The dynamic (kinetic) coefficient of friction was determined by evaluating the graph of the COF values beginning one second after the start of the measurement. Data was collected at a rate of ten readings/second and the average was recorded. Three samples were run for each film and the average of these three coefficient of friction measurements was reported. Values of 0.3 or less are desirable.

Pencil Hardness Free-standing bead films, as well as laminates and thermoformed laminates made therefrom, were evaluated for pencil hardness according to ASTM D 3363. Abrasive sandpaper (Grit No. 400) was adhered to a flat and smooth benchtop with double coated tape. Pencil leads (Turquoise Premium pencil leads (9H to 6B in hardness) from Prismacolor Professional Art Supplies, a subsidiary of Newell Rubbermaid Office Products, Oak Brook, Ill.) Totiens Drawing Leads with mechanical lead holder) were held at an angle of 90° to the abrasive paper and abraded until a flat, smooth, circular cross-section was achieved, free of chips or nicks on the edge of the lead. The force on the tip of the pencil was fixed at 7.5 N or in some cases less. The free-standing bead film was placed on a glass surface. Using a freshly prepared pencil lead for each test, the lead was pressed firmly against the film at a 45° angle and at the desired load using an Elcometer 3086 Motorised Pencil Hardness Tester (obtained from Elcometer Incorporated, Rochester Hills, Mich.) and drawn across the test panel in the "forward" direction for a distance of at least ¼ inch. Three pencil tracks were made for each grade of lead hardness. Prior to inspection, crumbled lead was removed from the test area using a damp paper towel wetted with isopropyl alcohol. The film was inspected by eye for defects and under an optical microscope (50×-1000× magnification) for the first ⅛ to ¼ inch of each pencil track. Moving from harder leads to softer, the process was repeated down the hardness scale until a pencil was found that did not scratch the film or rupture it, or dislodge or partially dislodge any beads. At least two of three tracks at each lead hardness were required to meet these criteria in order to pass. The hardest level of lead that passed was reported as the pencil hardness of the film. Values of 3H at a force of 5 Newtons, or harder, are desirable.

Taber Abrasion Resistance

Free-standing bead film samples were evaluated for rotary Taber abrasion resistance according to ASTM D4060-10: "Standard Test Method for Abrasion Resistance of Organic Coatings by the Taber Abraser" using the following parameters: a CS17 wheel was employed for 50 cycles. Haze was measured before and after testing and the change in % haze was reported. Values of 10 or less, or even 5 or less are desirable.

Solvent Resistance

Free-standing bead films, as well as laminates and thermoformed laminates made therefrom, were evaluated for solvent resistance as described in ASTM D5402-06 (2011) Method A using the following parameters. The solvent was MEK, a cheesecloth was used, the sample size was 5.1 by 2.5 cm (2 inches by 1 inch). The tested samples were evaluated under with a microscope at 100× using reflected light. The area rubbed with solvent was inspected for loss of beads. If 10% or less of the beads were observed to be missing the sample was rated "Pass". If more than 10% of the beads were observed to be missing the sample was rated "Fail".

Glass Transition Temperature (Tg)

The glass transition temperature (Tg) of the fluorourethane binder resin (neat) used in Examples 19-23 and Comparative Example 21 was determined by modulated differential scanning calorimetry (DSC) using a scan rate of 5° C./minute from −50° C. to 150° C. with a nitrogen atmosphere. The Tg was taken as the midpoint of the transition during the second scan using the instrument software.

Method for Making Bead Film Transfer Article

Borosilicate Bead Carrier 1

Borosilicate glass microspheres were flame treated by passing them through a hydrogen/oxygen flame at a rate of 3 grams/minute and collected in a stainless steel container whereupon metallic impurities were removed using a magnet. The resulting glass microspheres were treated with 600 ppm of Silquest A1100 in the following manner. The silane was dissolved in water, then added to the microspheres with mixing, air dried overnight, followed by drying at 110° C. for 20 minutes. The dried, silane treated microspheres were then sieved to remove any agglomerates and provide beads having a size of 75 micrometers or less and were free flowing. The resulting transparent silane treated microspheres were cascade coated using a mechanical sifter onto a transfer carrier comprising a polyethylene coated biaxially oriented polyester film substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Borosilicate Bead Carrier 2

A bead carrier having a uniform layer of transparent microspheres embedded in the polyethylene layer to a depth corresponding to about 30-40% of their diameter was prepared as described above for Borosilicate Bead Carrier 1 with the following modifications. Borosilicate glass powder was passed through the flame treatment twice to form microspheres before removing metallic impurities.

Soda Lime Silicate Bead Carrier

Soda lime silicate microspheres were used as received to prepare a bead carrier in the following manner. The glass microspheres were treated with 600 ppm of Silquest A1100 in the following manner. The silane was dissolved in water, then added to the microspheres with mixing, air dried overnight, followed by drying at 110° C. for 20 minutes. The dried, silane treated microspheres were then sieved to remove any agglomerates and provide beads having a size of 75 micrometers or less and were free flowing. The resulting transparent silane treated microspheres were cascade coated using a mechanical sifter onto a transfer carrier comprising a polyethylene coated biaxially oriented polyester film substrate liner which had been preheated to about 140° C. (284° F.), to form a bead carrier having a uniform layer of transparent microspheres embedded in the polyethylene layer to a depth corresponding to about 30-40% of their diameter as determined by a magnifying imaging system.

Example 1A

A solvent based solution of brominated fluoropolymer FP 1, trifunctional acrylate TA 1, and photoinitiator PI were mixed in a sealed jar on a roller overnight at room temperature (ca. 23° C. (73° F.) in a weight ratio of 80:20:1 to give a 35% solids solution (w/w) in MEK.

The resulting solution was applied to a 30.5 cm (12 inches) wide soda lime bead carrier, prepared as described above, using a coating square having a gap of 0.15 mm (0.006 inches) at a rate of about 3.0 meters/minute (10 feet/minute). The binder resin coated bead carrier was then dried in air at room temperature for one hour, followed by one hour at 70° C. (158° F.) for one hour, then cured with a high intensity, D bulb mercury lamp UV irradiation in air using a model HP-6 UV Lamp System (including a VPS-3 power supply, a I-6B irradiator, and a conveyer belt) from Fusion UV Systems, Incorporated, Gaithersburg, Md., set at 100% power and a line speed of 9.75 meters/minute (32 feet/minute). The binder resin coated bead carrier was passed through the curing chamber four times to provide the following total doses: UVA=992.1 mJ/cm$^2$; UVB=321.8 mJ/cm$^2$; UVC=42.9 mJ/cm$^2$; and UVV=1068 mJ/cm$^2$.

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTec Incorporated, Landrum, S.C.) at 3450 rpm for 30 seconds: 10.0 grams ICN 1, 12.04 grams POH 1, and ten microliters of T12 (450 ppm). The approximate ratio of equivalents isocyanate to equivalents hydroxyl was 1.05:1. This was then coated between a silicone treated polyester release film and the exposed surface of the binder resin (first) coating using a notch bar coater with a gap setting of 0.13 mm (0.005 inches) greater than the combined thickness of the release liner and once coated bead carrier.

The resulting twice coated, release liner covered, bead film was cured in a 70° C. (158° F.) forced air oven for one hour to provide a transfer article having soda lime silicate beads which were partially embedded in polyethylene on one side and in the fluoropolymer-acrylate binder resin layer on the other, and a coating of polyurethane resin over the fluoropolymer-acrylate binder resin layer.

A 0.157 mm (0.0062 inches) thick, free-standing bead film having a fluoropolymer-acrylate binder resin uniformly coated on one side with partially embedded soda lime silicate microspheres and on the other side with a 100% solids-based, two part polyurethane resin was obtained by removal of both the transfer carrier and the silicone-coated polyester film release liner.

Example 1B

Example 1A was repeated with the following modification. A coating square having a gap of 0.38 mm (0.015 inches) was employed.

A transfer article having soda lime silicate beads which were partially embedded in polyethylene on one side and in the fluoropolymer-acrylate binder resin layer on the other, and a coating of polyurethane resin over the fluoropolymer-acrylate binder resin layer was provided.

A 0.140 mm (0.0055 inches) thick, free-standing bead film having a fluoropolymer-acrylate binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Example 2A

Example 1A was repeated with the following modification. The weight ratio of FP 1, TA, and PI was 67:33:1 respectively.

A transfer article having soda lime silicate beads which were partially embedded in polyethylene on one side and in the fluoropolymer-acrylate binder resin layer on the other, and a coating of polyurethane resin over the fluoropolymer-acrylate binder resin layer was provided.

A 0.178 mm (0.0070 inches) thick, free-standing bead film having a fluoropolymer-acrylate binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Example 2B

Example 2A was repeated with the following modification. A coating square having a gap of 0.38 mm (0.015 inches) was employed.

A transfer article having soda lime silicate beads which were partially embedded in polyethylene on one side and in the fluoropolymer-acrylate binder resin layer on the other, and a coating of polyurethane resin over the fluoropolymer-acrylate binder resin layer was provided.

A 0.203 mm (0.0080 inches) thick, free-standing bead film having a fluoropolymer-acrylate binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Example 2C

Example 2B was repeated with the following modification. A two part epoxy resin was used in place of the polyurethane resin as the second coating layer. Epoxy 1 and Amine 1 were combined and mixed by hand in a weight ratio of 100:32 respectively. This mixture was then coated onto the exposed surface of the cured binder resin coated bead carrier using a Meyer bar. After allowing the epoxy/amine resin mixture to cure for six hours at room temperature then one hour at 70° C. (158° F.). A transfer article having soda lime silicate beads which were partially embedded in polyethylene on one side and in the fluoropolymer-acrylate binder resin layer on the other, and a coating of epoxy resin over the fluoropolymer-acrylate binder resin layer was provided. A 0.89 mm (0.035 inches) thick, free-standing bead film having a fluoropolymer-acrylate binder resin layer uniformly coated on one side with partially embedded soda lime silicate microspheres and on the other side with a 100% solids-based, two part epoxy resin was obtained by removal of both the transfer carrier and the silicone-coated polyester film release liner.

Example 3

A 42% solids (w/w) solution of FP 1 in MEK was coated onto a soda lime bead carrier and dried as described in Example 1A with the following modification. A coating square having a gap of 0.25 mm (0.010 inches) was employed. Next, a second coating of polyurethane resin was provided on the exposed surface of the fluoropolymer binder resin as described in Example 1A. A transfer article having soda lime silicate beads which were partially embedded in polyethylene on one side and in the fluoropolymer binder resin layer on the other, and a coating of polyurethane resin over the fluoropolymer binder resin layer was obtained. A 0.170 mm (0.0067 inches) thick, free-standing bead film having a fluoropolymer binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Example 4

Example 3 was repeated with the following modifications. A 20% solids (w/w) solution of FP 2 in MEK was employed in place of the FP 1 solution. A transfer article having soda lime silicate beads which were partially embedded in polyethylene on one side and in the fluoropolymer binder resin layer on the other, and a coating of polyurethane resin over the fluoropolymer binder resin layer was obtained. A transfer article having soda lime silicate beads which were partially embedded in polyethylene on one side and in the fluoropolymer binder resin layer on the other, and a coating of polyurethane resin over the fluoropolymer binder resin layer was obtained. A 0.142 mm (0.0056 inches) thick, free-standing bead film having a fluoropolymer binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Example 5

Example 4 was repeated with the following modifications. The solution of FP 2 was mixed with an aqueous solution of Amine 3 to provide a weight ratio of FP 2:Amine 3 of 16:1 in a solvent mixture of MEK:water/99.1:0.9 (w/w) at a solids levels of 20.8% solids by weight. In addition, a coating square having a gap 0.15 mm (0.006 inches) was employed. Drying was done at room temperature for 1 hour followed by one hour at 65° C. A transfer article having soda lime silicate beads which were partially embedded in polyethylene on one side and in the amine-containing fluoropolymer binder resin layer on the other. The transfer article was then coated with a100% solids, two part urethane mixture as described in Example 1A. A 0.152 mm (0.0064 inches) thick, free-standing bead film having an amine-containing fluoropolymer binder resin layer uniformly coated on one side with partially embedded soda lime silicate microspheres and on the other side with a 100% solids-based, two part polyurethane resin was obtained by removal of both the transfer carrier and the silicone-coated polyester film release liner.

Examples 6A-I

A 20% solids (w/w) solution of FP 2 in MEK was applied onto a 20.3 cm (8 inches) wide by 30.5 cm (12 inches) long soda lime bead carrier, prepared as described above, using a coating line equipped with a notch bar coating head and three drying ovens set at 70° C., 80° C., and 80° C. respectively at a rate of 152 cm/minute (5 feet/minute). The total drying time was 6 minutes. The gap setting on the coating head was varied from 0.051 mm to 0.51 mm (0.002 inches to 0.020 inches). After drying some of the samples were plasma treated on their exposed fluoropolymer surface for 5 minutes at 18 W using a vacuum evacuated, oxygen plasma unit (Harrick PDC-32G Plasma Cleaner/Sterilizer, available from Harrick Plasma, Ithaca, N.Y.). Contact angles were measured on samples of 6D to evaluate the surface treatment. The results were as follows. Advancing contact angle before plasma treatment: 139.1 degrees; advancing contact angle after plasma treatment: 82.3 degrees; receding contact angle before plasma treatment: 49.5 degrees; receding contact angle after plasma treatment: 20.7 degrees. The exposed fluoropolymer surface of all samples were then coated with a 100% solids, two part polyurethane resin and cured as described in Example 1A. Free-standing bead films having a fluoropolymer binder resin uniformly coated on one side with partially embedded soda lime silicate microspheres and on the other side with a 100% solids-based, two part polyurethane resin were obtained by removal of both the transfer carrier and the silicone-coated polyester film release liner. A summary is shown below.

| Ex. | Gap Setting (mm) | Plasma Treatment |
|-----|------------------|------------------|
| 6A  | 0.051            | No               |
| 6B  | 0.102            | No               |
| 6C  | 0.152            | No               |
| 6D  | 0.254            | No               |
| 6E  | 0.051            | Yes              |
| 6F  | 0.102            | Yes              |
| 6G  | 0.152            | Yes              |
| 6H  | 0.254            | Yes              |
| 6I  | 0.508            | Yes              |

Example 7A

Example 6E was repeated with the following modifications. A 20% solids (w/w) solution in MEK of FP 2 was prepared by dissolving 2 kg FP 2 in 8 kg MEK using a roller mill over several days. A 20% solids solution (w/w) of Amine 2 in MEK was prepared just before use. Next, a 99.1:0.9 (w/w) mixture of the FP 2:Amine 2 solution was prepared by adding the Amine 2 solution slowly into the FP 2 solution with continuous stirring over 20 minutes. The resulting FP 2/Amine 2 solution was applied, 40 minutes after preparation, onto an 33.0 cm (13 inches) wide by 152.4 cm (60 inches) wide borosilicate bead carrier 1, prepared as described above, using a knife coater having a gap setting of about 0.064 mm (0.0025 inches) greater that the thickness of the bead carrier. The solution was applied at a rate of 28 grams/minute to provide dried coating weight of 11.1 grams/square meter. The once coated, dried borosilicate bead carrier was then plasma treated as described in Example 6. Next, a 100% solids, two-part polyurethane mixture was used to coat the exposed, plasma treated fluoropolymer surface of the once coated bead carrier as described in Example 1A with the following modifications. The polyurethane mixture was prepared using 1.52 g ICN 1, 11.75 g ICN 2, 15.28 g POH 2, 2.08 g POH 3, and 27 microliters (900 ppm) of T12 catalyst. The approximate ratio of equivalents isocyanate to equivalents hydroxyl was 1.05:1. The resulting twice coated, release liner covered, bead film were cured in a 80° C. forced air oven for one hour to provide transfer articles having borosilicate beads which were partially embedded in polyethylene on one side and in the fluoropolymer-amine binder resin layer on the other, and a coating of polyurethane resin over the fluoropolymer-amine binder resin layer.

A free-standing bead film having a thickness of 0.157 mm (0.0062 inch) and having a fluoropolymer-amine binder resin uniformly coated on one side with partially embedded borosilicate microspheres and on the other side with a 100% solids-based, two part polyurethane resin was obtained by removal of both the transfer carrier and the silicone-coated polyester film release liner.

Example 7B

Example 7A was repeated with the following modification. The solution was applied at a rate of 56 grams/minute to provide dried coating weight of 22.2 grams/square meter. A free-standing bead film having a thickness of 0.157 mm (0.0062 inch) and having a fluoropolymer-amine binder resin uniformly coated on one side with partially embedded borosilicate microspheres and on the other side with a 100% solids-based, two part polyurethane resin was obtained by removal of both the transfer carrier and the silicone-coated polyester film release liner. A scanning electron micrograph of a freeze fractured section indicated a first layer coating thickness of about 0.030 mm (0.0012) between the borosilicate beads and a fluoropolymer coating layer thickness over the tops of the beads of 0.003 to 0.006 mm (0.0001 to 0.0002 inches).

Example 7C

Example 7A was repeated with the following modification. The ratio of FP 2:Amine 2 solutions was 98.5:1.5 (w/w). A free-standing bead film having a thickness of 0.157 mm (0.0062 inch) and having a fluoropolymer-amine binder resin uniformly coated on one side with partially embedded borosilicate microspheres and on the other side with a 100% solids-based, two part polyurethane resin was obtained by removal of both the transfer carrier and the silicone-coated polyester film release liner. A scanning electron micrograph of a freeze fractured section indicated a first layer coating thickness of about 0.014 mm (0.0006 inches) between the borosilicate beads and a fluoropolymer coating layer thickness over the tops of the beads of 0.0010 mm (0.00004 inches).

Example 7D

Example 7C was repeated with the following modification. The solution was applied at a rate of 56 grams/minute to provide dried coating weight of 22.2 grams/square meter. A free-standing bead film having a thickness of 0.157 mm (0.0062 inch) and having a fluoropolymer-amine binder resin uniformly coated on one side with partially embedded borosilicate microspheres and on the other side with a 100% solids-based, two part polyurethane resin was obtained by removal of both the transfer carrier and the silicone-coated polyester film release liner.

Example 8A

Example 1A was repeated with the following modifications. A 40% solids (w/w) solution of only FP 3 was used in place of the 35% solids solution of FP 1. This solution was coated onto the bead carrier using a coating square having 0.10 mm (0.004 inches) gap. After drying (no UV cure step was employed) a 2 part polyurethane layer containing 12.64 grams POH 1 and having an approximate ratio of isocyanate equivalents to hydroxyl equivalents of 1.0:1.0 was coated onto the binder resin (once coated) bead carrier. The resulting twice coated bead carrier was cured in an oven at 80° C. for 1 hour. A free-standing bead film having a thickness of 0.254 mm (0.010 inches) and having a fluoropolymer binder resin uniformly coated on one side with partially embedded soda lime silicate microspheres and on the other side with a 100% solids-based, two part polyurethane resin was obtained by removal of both the transfer carrier and the silicone-coated polyester film release liner.

Example 8B

Example 8A was repeated but with the following modification. The fluoropolymer solution was coated onto the bead carrier using a 0.152 mm (0.006 inch) gap. A free-standing bead film having a thickness of 0.267 mm (0.0105 inches) and having a fluoropolymer binder resin uniformly coated on one side with partially embedded soda lime silicate microspheres and on the other side with a 100% solids-based, two part polyurethane resin was obtained by removal of both the transfer carrier and the silicone-coated polyester film release liner.

Example 9

To 12.7 kg of a solution of FPOH 1 was added 2.3 kg ethyl acetate and 3.06 grams of T12 (300 ppm in the final dried polyurethane resin) to give a 55% solids (w/w) solution. A 50% solids (w/w) solution of ICN 1 in ethyl acetate was also prepared. The FPOH 1/T12 solution and ICN 1 solution were fed into a static mixer at 28.7 grams/minute and 8.8 grams/minute respectively to provide an output rate of 37 grams/minute onto a 152.4 cm (60 inches) long borosilicate bead carrier 2 at a width of 20.3 cm (8 inches) using a knife coater having a gap setting of about 0.064 mm (0.0025 inches) greater that the thickness of the bead carrier. The coating was carried out at a speed of 1.52 meters/minute (5 feet/minute) and dried and cured in line in three ovens set at 70° C., 80° C., and 90° C. (158° F., 176° F., and 194° F.) respectively to give a binder resin (once) coated bead carrier. A dried coating weight of 65.3 grams/square meter was thus provided. The approximate ratio of equivalents isocyanate to equivalents hydroxyl was 1.3:1.0. The total thickness of the once coated bead carrier was measured and found to be 0.019 mm (0.0076 inches).

Example 9A

Next, a 100% solids, two-part polyurethane mixture was prepared by combining and mixing the following components as described in Example 1A with the following modification. The speed of mixing was 2500 rpm: 10.0 grams ICN 1, 13.3 grams POH 1, and seven microliters of T12 (300 ppm). The approximate ratio of equivalents isocyanate to equivalents hydroxyl was 0.95:1.0. This was then coated and cured as described in Example 1A to provide a transfer article having borosilicate beads which were partially embedded in polyethylene on one side and in the fluoro-urethane binder resin layer on the other, and a coating of polyurethane resin over the fluoro-urethane binder resin layer. A 0.25 mm (0.010 inches) thick, free-standing bead film having a fluoro-urethane binder resin uniformly coated on one side with partially embedded borosilicate microspheres and on the other side with a 100% solids-based, two part polyurethane resin was obtained by removal of both the transfer carrier and the silicone-coated polyester film release liner.

Example 9B

Example 9A was repeated with the following modification. The exposed fluoro-urethane surface of the binder resin (once) coated bead carrier was plasma treated as described in Example 6A prior to applying a 100% solids, two part polyurethane coating layer. The two part polyurethane coating contained 12.6 grams POH 1 and had an approximate ratio of equivalents isocyanate to equivalents hydroxyl was 1.0:1.0. A transfer article having borosilicate beads which were partially embedded in polyethylene on one side and in the fluoro-urethane binder resin layer on the other, and a coating of polyurethane resin over the fluoro-urethane binder resin layer. A 0.24 mm (0.0095 inches) thick, free-standing bead film having a fluoro-urethane binder resin uniformly coated on one side with partially embedded borosilicate microspheres and on the other side with a 100% solids-based, two part polyurethane resin was obtained by removal of both the transfer carrier and the silicone-coated polyester film release liner. A scanning electron micrograph of a freeze fractured section indicated a first layer coating thickness of about 0.060 to 0.070 mm (0.0024 to 0.0028 inches) between the borosilicate beads and a fluoropolymer coating layer thickness over the tops of the beads of 0.018 to 0.027 mm (0.0007 to 0.001 inches).

Example 9C

Example 9A was repeated with the following modifications. The 100% solids, two part polyurethane composition was prepared using 16 grams ICN 1, 17.80 grams POH 1, 11 microliters (300 ppm) T12, 3.31 grams Additive 1, and 0.10 grams Additive 2. The approximate ratio of equivalents isocyanate to equivalents hydroxyl was 1.05:1.0. A 0.051 mm (0.002 inches) thick, white pigmented polyester film (opacity of 87-96% as measured by Hunter Y Contrast ratio, and a whiteness index of 111-126 (0°/45°) per ASTM 313 (D65 10°)) was used in place of the silicone treated polyester release film. A transfer laminate article having borosilicate beads which were partially embedded in polyethylene on one side and in the fluoro-urethane binder resin layer on the other, a coating of polyurethane resin over the fluoro-urethane binder resin layer, and a white polyester film bonded to the polyurethane layer on the side opposite the fluoro-urethane layer was provided. A 0.36 mm (0.014 inches) thick, free-standing bead film laminate having a fluoro-urethane binder resin uniformly coated on one side with partially embedded borosilicate microspheres and on the other side with a 100% solids-based, two part polyurethane resin, and a white polyester film bonded to the polyurethane layer on the side opposite the fluoro-urethane layer was obtained by removal of the transfer carrier.

Example 10

Example 1B was repeated with the following modification. Twenty pbw of TA 2 was included in the fluoropolymer-acrylate coating solution in place of TA 1. A transfer article having soda lime silicate beads which were partially embedded in polyethylene on one side and in the fluoropolymer-acrylate binder resin layer on the other, and a coating of polyurethane resin over the fluoropolymer-acrylate binder resin layer.

A 0.157 mm (0.0062 inches) thick, free-standing bead film having a fluoropolymer-acrylate binder resin uniformly coated on one side with partially embedded soda lime silicate microspheres and on the other side with a 100% solids-based, two part polyurethane resin was obtained by removal of both the transfer carrier and the silicone-coated polyester film release liner.

Comparative Example 1

A 60% solids solution in MEK of ICN 1, POH 1, and T12 in a ratio of 10 grams:13.3 grams:7 microliters (300 ppm based on the combined weight of isocyanate and polyol components) respectively was prepared to provide an approximate ratio of 0.95 equivalents isocyanate to 1.0 equivalents hydroxyl. The resulting binder resin mixture was coated onto a 30.5 cm (12 inches) wide borosilicate bead carrier 1 using a notchbar coater with a gap setting of approximately 0.10 mm (0.004 inches) at a pull through rate of approximately 3.0 to 3.7 meters/minute (10 to 12 feet/minute). This was dried in air at room temperature for one hour then placed in a forced air oven at 70° C. (158° F.) for one hour to provide a dried, cured polyurethane binder resin layer having a thickness of approximately 0.051 mm (0.002 inches).

Next, ICN 1, POH 1, and T12 were combined and mixed in a ratio of 10 grams:13.3 grams:7 microliters (300 ppm) as described in Example 1A to provide a 100% solids mixture having an approximate ratio of 0.95 equivalents isocyanate to 1.0 equivalents hydroxyl.

The mixture was then coated between the binder resin coated bead carrier and a silicone-coated polyester film release liner using a notchbar coater having a gap setting and pull rate of approximately 0.051 mm (0.002 inches) and approximately 3.0 meters/minute (10 feet/minute). The second layer coated article was then cured for 1 hour at 70° C. (158° F.). A transfer article having borosilicate beads which were embedded in polyethylene on one side and in a two layered polyurethane resin on the other side was thus provided. A free-standing bead film of a two layered polyurethane resin uniformly coated on one side with exposed, partially embedded borosilicate microspheres and having an approximate thickness of 0.14 mm (0.0055 inches) was obtained by removal of both the transfer carrier and the silicone-coated polyester film release liner.

Comparative Example 2

A solvent based solution of polyester resin 1, FPUA 1, and PI were mixed in MEK in a sealed jar on a roller overnight at room temperature (ca. 23° C. (73° F.)) in a weight ratio of 97.5:2.5:1 to give a 20% solids solution (w/w).

The resulting solution was applied to a 30.5 cm (12 inches) wide soda lime bead carrier, prepared as described above, using a coating square having a gap of 0.25 mm (0.010 inches) at a rate of about 3.0 meters/minute (10 feet/minute). The binder resin coated bead carrier was then dried in air at room temperature followed by one hour at 70° C. (158° F.) then cured in air using a high intensity, D bulb mercury lamp UV irradiation as described in Example 1A.

Next, a 100% solids, two-part polyurethane mixture of ICN 1, POH 1, and T12 was prepared as described in Example 1A. The approximate ratio of equivalents isocyanate to equivalents hydroxyl was 1.05:1. This was then coated between a silicone treated polyester release film and the exposed surface of the binder resin coating using a notch bar coater with a gap setting of 0.13 mm (0.005 inches) greater than the combined thickness of the release liner and once coated bead carrier.

The resulting twice coated, release liner covered, bead film was cured in a 70° C. (158° F.) forced air oven for one hour to provide a transfer article having soda lime silicate beads which were partially embedded in polyethylene on one side and in the polyester and fluoropolymer binder resin blend layer on the other, and a coating of polyurethane resin over the polyester and fluoropolymer binder resin blend layer.

When the transfer carrier was removed delamination was observed between the binder resin and the polyurethane resin layers.

Comparative Example 3

Rectangular samples measuring approximately one inch in length of FP 4 were dissolved in MEK using a shaker platform at room temperature for 24 hours. The solids content of the solution was found to be 20% (w/w). This solution was applied to 30.5 cm (12 inches) wide soda lime bead carrier, prepared as described above, using a coating square having a gap of 0.15 mm (0.006 inches) at a rate of about 3.0 meters/minute (10 feet/minute). The coated film was then air dried in air at room temperature for one hour followed by drying in a 70° C. (158° C.) for one hour. The exposed surface of the fluoropolymer film was then plasma treated, as described in Example 6A, and a 100% solids, two part urethane mixture was applied to the treated surface and cured, also as given in example 6A. A transfer article having soda lime silicate beads which were partially embedded in polyethylene on one side and in the fluoropolymer binder resin layer on the other, and a coating of polyurethane resin over the fluoropolymer binder resin layer. A 0.29 mm (0.0115 inches) thick, free-standing bead film having a fluoropolymer binder resin uniformly coated on one side with partially embedded soda lime silicate microspheres and on the other side with a 100% solids-based, two part polyurethane resin was obtained by removal of both the transfer carrier and the silicone-coated polyester film release liner.

Comparative Example 4

The following materials were added to a jar, the jar sealed, and shaken by hand for five minutes: 0.41 grams of Additive 3, 81.59 grams of deionized water, and 8.0 grams of 1-methoxy 2-propanol. Next, 10.0 g of FPUA 2 was added and the sealed jar was placed on a roller mixer for approximately 25 minutes followed by mixing using a speedmixer as described in Example 9A. The resulting solution was applied to a borosilicate bead carrier 1, using a coating square having a gap of 0.25 mm (0.010 inches) at a rate of about 3.0 meters/minute (10 feet/minute). The binder resin coated bead carrier was then dried in air at room temperature for 75 minutes followed by one hour at 70° C. (158° F.) in an oven. A bead carrier having a very thin, transparent, binder resin layer which was barely noticeable by its edges was thus provided. Next, a 100% solids, two-part polyurethane mixture was prepared by combining and mixing the following components as described in Example 1A with the following modification. ICN 1:POH 1 in a weight ratio of 12.0:14.45 (the approximate ratio of equivalents isocyanate to equivalents hydroxyl was 1.05:1.0) were first combined using the speedmixer at 2500 rpm for 30 seconds, then 7.93 microliters (300 ppm) T12 was added and the mixing repeated. The resulting twice coated, release liner covered, bead film was cured in a 70° C. (158° F.) forced air oven for one hour to provide a transfer article having borosilicate beads which were partially embedded in polyethylene on one side and in the FPUA 2 binder resin layer on the other, and a coating of polyurethane resin over the FPUA 2 binder resin layer. A 0.20 mm (0.008 inches) thick, free-standing bead film having a fluoropolymer modified urethane acrylate binder resin uniformly coated on one side with partially embedded borosilicate microspheres and on the other side with a 100% solids-based, two part polyurethane resin was obtained by removal of both the transfer carrier and the silicone-coated polyester film release liner.

Comparative Example 5

A 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 3450 rpm for 30 seconds: 2.5 grams ICN 5, 2.28 grams of a 67% (w/w) solution of FPOH 2 in dry MEK, and 1.9 microliters of T12 (400 ppm). The approximate ratio of equivalents isocyanate to equivalents hydroxyl was 1.1:1.0.

The solution was coated onto a soda lime silicate bead liner using a coating square having a 0.15 mm (0.006 inches) gap at a rate of approximately 3 meters/minute (10 feet/minute) followed by drying in air at room temperature for one hour then cured at 70° C. (158° F.) in an oven for one hour to provide a binder resin (once) coated bead carrier. Next, a 100% solids, two-part polyurethane mixture was prepared by combining and mixing the following components using a speedmixer as described in Example 9A with the following modifications. The materials and amounts used were 10.0 grams ICN 1, 12.04 grams POH 1, 10 microliters (450 ppm) T12 (the approximate ratio of equivalents isocyanate to equivalents hydroxyl was 1.05:1.0). The mixing speed was 3450 rpm. This mixture was then coated between a silicone treated polyester release film and the exposed surface of the binder resin (first) coating and cured as described in Example 9A to provide a transfer article having soda lime silicate beads which were partially embedded in polyethylene on one side and in the fluoro-urethane binder resin layer on the other, and a coating of polyurethane resin over the fluoro-urethane binder resin layer. A 0.24 mm (0.0095 inches) thick, free-standing bead film having a fluoro-urethane binder resin uniformly coated on one side with partially embedded soda lime silicate microspheres and on the other side with a 100% solids-based, two part polyurethane resin was obtained by removal of both the transfer carrier and the silicone-coated polyester film release liner.

Comparative Example 6

Comparative Example 5 was repeated with the following modifications. A two-part polyurethane mixture was prepared by combining and mixing the following components: 5.0 grams ICN 4, 2.31 grams of FPOH 2 solution, and 3 microliters (400 ppm) of T12. The approximate ratio of equivalents isocyanate to equivalents hydroxyl was 1.05:1.0. A transfer article having borosilicate beads which were partially embedded in polyethylene on one side and in the fluoro-urethane binder resin layer on the other, and a coating of polyurethane resin over the fluoro-urethane binder resin layer was thus obtained. A 0.24 mm (0.0095 inches) thick, free-standing bead film having a fluoro-urethane binder resin uniformly coated on one side with partially embedded borosilicate microspheres and on the other side with a 100% solids-based, two part polyurethane resin was obtained by removal of both the transfer carrier and the silicone-coated polyester film release liner.

Example 11

An 18% solids (w/w) solution of FP 2 in a 1:1 (w:w) mixture of MAK:MEK was applied onto a 20.3 cm (8 inches) wide soda lime bead carrier, prepared as described above, using a coating line equipped with a notch bar coating head, three drying ovens each set at 90° C., at a rate of 152 cm/minute (5 feet/minute). The total drying time was 14.5 minutes. The gap setting on the coating head was 0.254 mm (0.010 inches). A scanning electron micrograph of a freeze fractured section indicated a first layer coating thickness of about 0.030 mm (0.0012) between the soda lime silicate beads and a fluoropolymer coating layer thickness over the tops of the beads of about 0.010 mm (0.0004 inches). After drying, samples of the fluoropolymer coated soda lime silicate bead carrier were plasma treated on their exposed fluoropolymer surface for 2 minutes at 7.5 W, using a vacuum evacuated, oxygen plasma unit (ATTO Model Low Pressure Plasma System, available from Diener Electronic, Ebhausen, Germany) to provide a plasma treated fluoropolymer coated soda lime bead carrier measuring 27.9 cm by 30.5 cm (11 inches by 12 inches).

Example 11A

A 100% solids, two-part polyurethane mixture was used to coat the exposed, plasma treated fluoropolymer surface of the once coated bead carrier prepared in Example 11. The following components were combined and mixed in a cup using a centrifugal resin mixer as described in Example 1A: 10.0 grams ICN 1, 12.64 grams POH 1, and 7 microliters (300 ppm) of T12. The approximate ratio of equivalents isocyanate to equivalents hydroxyl was 1.0:1.0. This was then coated between a silicone treated polyester release liner and the exposed surface of the plasma treated fluoropolymer layer of the treated bead carrier described in Example 11 using a notch bar coater having a gap setting of 0.15 mm (0.006 inches) greater than the combined thickness of the silicone treated polyester release liner and once coated bead carrier. This was then cured for one hour at 70° C. (158° F.) in a forced air oven.

A 0.28 mm (0.011 inches) thick, free-standing bead film having a fluoropolymer binder resin uniformly coated on one side with partially embedded soda lime silicate microspheres and on the other side with a 100% solids-based, two part polyurethane resin was obtained by removal of both the transfer carrier and the silicone-coated polyester film release liner.

Example 11B

A 100% solids, two-part polyurethane mixture was used to coat the exposed, plasma treated fluoropolymer surface of the once coated bead carrier prepared in Example 11. The following components were combined and mixed under vacuum provided by a mechanical pump in a cup using a centrifugal resin mixer as described in Example 1A: 13.3 grams ICN 2, 0.7 grams ICN 1, 14.03 grams POH 2, 2.67 grams POH 3, and 28 microliters (900 ppm) of T12. The approximate ratio of equivalents isocyanate to equivalents hydroxyl was 1.025:1. This was then coated between a film of PET 1 and the exposed surface of the plasma treated fluoropolymer layer of the treated bead carrier described in Example 11 using a notch bar coater with a gap setting of 0.06 mm (0.0025 inches) greater than the combined thickness of the PET 1 film and once coated bead carrier. The resulting twice coated, release liner covered, bead film was cured in five stages as follows: 30 minutes at 40° C. (104° F.); 30 minutes at 50° C. (122° F.); 30 minutes at 60° C. (140° F.); 30 minutes at 70° C. (158° F.); and finally for 45 minutes at 80° C. (176° F.). A transfer laminate article having soda lime silicate beads which were partially embedded in polyethylene on one side and in the fluoropolymer binder resin layer on the other, a coating of polyurethane resin over the fluoropolymer binder resin layer, and a clear PET 1 film bonded to the polyurethane layer on the side opposite the fluoropolymer layer was provided.

A 0.28 mm (0.011 inches) thick, free-standing bead film laminate having a fluoropolymer binder resin uniformly coated on one side with partially embedded soda lime silicate microspheres and on the other side with a 100% solids-based, two part polyurethane resin, and PET 1 film bonded to the polyurethane layer on the side opposite the fluoropolymer layer was obtained by removal of the transfer carrier.

Comparative Example 7

A two-part polyurethane mixture was prepared by combining and mixing 9.5 grams ICN 2, 0.5 grams ICN 1, 8.48 grams POH 2, and 2.11 grams POH 3, and 19 microliters (900 ppm) of T12 in a cup using a centrifugal resin mixer as described in Example 1A with the following modifications. Mixing was done at 2500 rpm for 30 seconds under vacuum provided by a mechanical pump. The approximate ratio of equivalents isocyanate to equivalents hydroxyl was 1.025:1.0. The resulting 100% solids, two part polyurethane binder resin was then coated between a 30.5 cm (12 inches) wide soda lime silicate bead carrier, prepared as described above, and a 0.13 mm (0.005 inch) thick PC film using a notchbar coater having a gap setting of 0.05 mm (0.002 inches) (greater than the combined thickness of the bead carrier and PC film) and a pull rate of approximately 3.0 to 3.7 meters/minute (10 to 12 feet/minute). The resulting coated, bead film article was cured as described in Example 11B. A transfer laminate article having soda lime silicate microsphere beads which were partially embedded in polyethylene on one side and in the polyurethane binder resin layer on the other, and a clear PC film bonded to the polyurethane layer on the side opposite the microspheres was provided.

A 0.24 mm (0.0095 inches) thick, free-standing bead film laminate having a polyurethane binder resin uniformly coated on one side with partially embedded soda lime silicate microspheres and on the other side with a 100% solids-based, two part polyurethane resin, and PC film bonded to the polyurethane layer on the side opposite the microspheres was obtained by removal of the transfer carrier.

Example 12

Figure 1B:
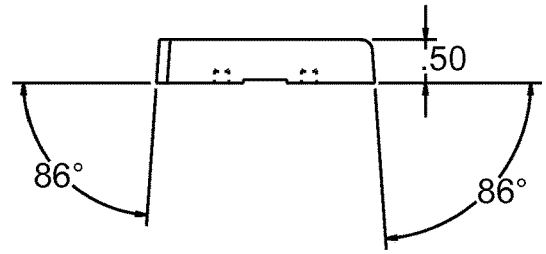
FIGS. 1B and 1D illustrate exemplary side cross section views of an article according to the present disclosure.
Figure 1C:
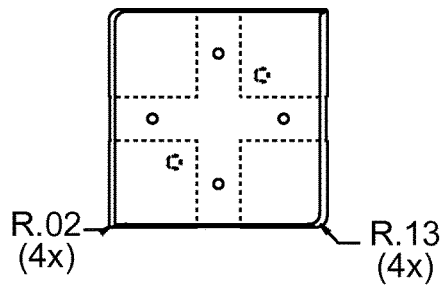
FIG. 1C illustrates an exemplary top cross section view of an article according to the present disclosure.
Figure 1D:
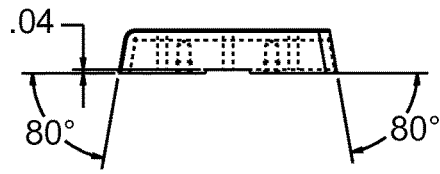
Figure 1E:
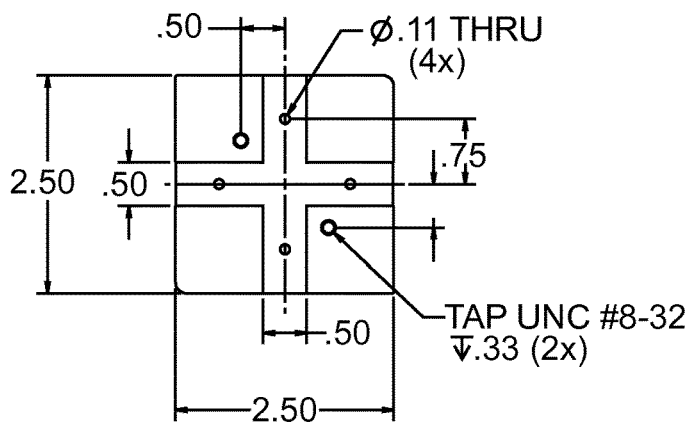
FIG. 1E illustrates an exemplary top plan view of an article according to the present disclosure.

A thermoformed free-standing bead film laminate was prepared from the free-standing bead film laminate of Example 11B as follows. A sample of the film laminate of Example 11B, measuring 20.3 cm (8 inches) square, was thermoformed using a COMET thermoformer (model C32.5S, MAAC Machinery Corporation, Carol Stream, Ill.). A male test mold having a 6.35 cm (2.50 inches) square base, a height of 1.27 cm (0.5 inches), and various radii and draft angles to its vertical sides was used to form the films (see FIGS. 1A-E). The thermoforming parameters shown in the table below were employed. The sheet temperature just before molding was measured using a SCOTCHTRAK™ Infrared Heat Tracer IR-16L3 (a laser sight equipped, portable non-contact (infrared) thermometer, 3M Company, St. Paul, Minn.). The resulting fluoropolymer coated soda lime bead carrier did not exhibit any visible bubbles, even around the beads, when sample areas were examined under a microscope at 20×.

Comparative Example 8

Example 12 was repeated with the following modifications. The free-standing bead film laminate of Comparative Example 7 was used in place of Example 11B, and the thermoforming parameters shown in the table below were employed. The resulting polyurethane coated soda lime bead film laminate did not exhibit any visible bubbles, even around the beads, when sample areas were examined as described in Example 12.

Example 13

A fluoropolymer-coated soda lime bead carrier was prepared as described in Example 11 with the following modifications. After drying, the exposed fluoropolymer surface was treated with e-beam at 220 kV accelerating voltage, a line speed of 6.64 meters/minute (21.8 feet/minute), and a dose of 10 Mrad using a CB300 E-Beam device (Energy Sciences, Incorporated, Wilmington, Mass.). Next, the exposed, e-beamed fluoropolymer surface was plasma treated as described in Example 6. An e-beamed, plasma treated fluoropolymer coated soda lime bead carrier measuring 17.9 cm by 22.9 cm (7 inches by 9 inches) was thus obtained. A 100% solids, two-part polyurethane mixture was then used to coat the exposed, e-beamed, plasma treated fluoropolymer surface of the once coated bead carrier as described in Example 11A.

A 0.254 mm (0.010 inches) thick, free-standing bead film having a fluoropolymer binder resin uniformly coated on one side with partially embedded soda lime silicate microspheres and on the other side with a 100% solids-based, two part polyurethane resin was obtained by removal of both the transfer carrier and the silicone-coated polyester film release liner.

Example 14

Example 13 was repeated with the following modifications. The e-beam dose was 15 Mrads. Plasma treatment was carried out for 3 minutes as described in Example 11 to provide an e-beamed, plasma treated fluoropolymer coated soda lime bead carrier measuring 27.9 cm by 30.5 cm (11 inches by 12 inches). A 100% solids, two-part polyurethane mixture was then used to coat the exposed, e-beamed, plasma treated fluoropolymer surface of the once coated bead carrier as described in Example 11B. A transfer laminate article having soda lime silicate beads which were partially embedded in polyethylene on one side and in the fluoropolymer binder resin layer on the other, a coating of polyurethane resin over the fluoropolymer binder resin layer, and a clear PET 1 film bonded to the polyurethane layer on the side opposite the fluoropolymer layer was provided.

A 0.28 mm (0.011 inches) thick, free-standing bead film laminate having a fluoropolymer binder resin uniformly coated on one side with partially embedded soda lime silicate microspheres and on the other side with a 100% solids-based, two part polyurethane resin, and PET 1 film bonded to the polyurethane layer on the side opposite the fluoropolymer layer was obtained by removal of the transfer carrier.

Example 15

A thermoformed free-standing bead film laminate was prepared was described in Example 12 with the following modification. The free-standing bead film laminate of Example 14 was used in place of the laminate of Example 11B.

The resulting fluoropolymer coated soda lime bead carrier did not exhibit any visible bubbles, even around the beads, when sample areas were examined under a microscope at 20×.

| Thermoforming Parameters | | | |
|---|---|---|---|
| Parameter | Example 12 | Example 15 | Comparative Example 8 |
| Upper Radiant Oven Master Output (%) | 55 | 55 | 55 |
| Lower Radiant Oven Master Output (%) | 55 | 55 | 55 |
| Upper Radiant Oven Compensation (%) | −75 | −75 | −99 |
| Lower Radiant Oven Compensation (%) | −25 | −25 | 20 |
| Bead Film Laminate Preheat Time (seconds) | 5.5 | 5 | 25 |
| Oven Door Position | Closed | Closed | Open |
| Vacuum | Max | Max | Max |
| Pressure Box Working Pressure (MPa) (PSI) | 0.31 (45) | 0.43 (62) | 0.31 (45) |
| Top Platen Delay (seconds) | 0.1ok . . . | 0.1 | 0.1 |
| Measured Sheet Temperature Immediately Before Thermoforming (° C.) (° F.) | 111 (232) | 105 (221) | 188 (370) |
| Mold Temperature (° C.) (° F.) | 79 (174) | 79 (174) | 35 (95) |

Results

TABLE 1

| Stain Resistance - Mustard | |
|---|---|
| Ex. No. | Stain Resistance (delta b*) (66° C./80% RH/72 hrs) |
| 1A | 14.33 |
| 1B | 14.88 |
| 2B | 10.44 |
| 2C | 10.94 |
| 3 | 11.32 |
| 4 | 11.46 |
| 5 | 13 |
| 6A | 18.51 |
| 6B | 16.64 |
| 6C | 15.28 |
| 6E | 11.55 |
| 6F | 6.19 |
| 6G | 6.77 |
| 6H | 7.13 |
| 6I | 2.98 |
| 7A | 11.84 |
| 7B | 11.74 |
| 7C | 12.16 |
| 7D | 12.67 |
| 8A | 26.98 |
| 8B | 21.69 |
| CE 1 | 99.23 |
| CE 2 | 62.34 |
| CE 3 | 75.25 |
| 9A | 19.49 |
| 9B | 16.49 |
| 9C | 18.07 |
| 10 | 28.33 |
| CE 4 | 95.02 |

TABLE 1-continued

Stain Resistance - Mustard

| Ex. No. | Stain Resistance (delta b*) (66° C./80% RH/72 hrs) |
|---|---|
| CE 5 | 102.87 |
| CE 6 | 89.56 |
| 11A | 15.79 |
| 11B | 13.12 |
| CE 7 | 99.1 |
| 12 | 12.58 |
| CE 8 | 103.1 |
| 13 | 9.46 |
| 14 | 11.15 |
| 15 | 11.32 |

TABLE 2

Coefficient of Friction (COF)

| Ex. No. | COF |
|---|---|
| 1A | 0.145 |
| 2A | 0.149 |
| 3 | 0.171 |
| 4 | 0.158 |
| 6C | 0.219 |
| 6E | 0.223 |
| 6F | 0.206 |
| 6G | 0.194 |
| 6H | 0.170 |
| 7A | 0.156 |
| 7B | 0.164 |
| 7C | 0.155 |
| 7D | 0.16 |
| 8A | 0.234 |
| 8B | 0.232 |
| 9A | 0.187 |
| 9B | 0.160 |
| 9C | 0.158 |
| 11A | 0.145 |
| 11B | 0.167 |
| CE 7 | 0.135 |
| 12 | 0.157 |
| CE 8 | 0.157 |
| 13 | 0.182 |
| 14 | 0.187 |
| 15 | 0.147 |

TABLE 3

Taber Abrasion Resistance

| Ex. No. | Tabor Abrasion (change in % haze) |
|---|---|
| 3 | 9.78 |
| 4 | 3.22 |
| 6A | 1.20 |
| 6B | 0.87 |
| 6C | 1.02 |
| 6E | 2.00 |
| 6F | 1.72 |
| 6G | 1.52 |
| 6H | 1.27 |
| 6I | 4.60 |
| 7A | 2.42 |
| 7B | 2.32 |
| 7C | 1.37 |
| 7D | 1.52 |
| 8A | 2.10 |
| 8B | 2.72 |
| 9A | 1.70 |
| 9B | 1.45 |

TABLE 4

Pencil Hardness

| Ex. No. | Pencil Hardness |
|---|---|
| 1A | >9H 7.5N |
| 1B | 2B 7.5N |
| 2C | >9H 7.5N |
| 3 | >9H 7.5N |
| 4 | >9H 7.5N |
| 6A | >9H 2.5N |
| 6B | >9H 5N |
| 6C | >9H 5N |
| 6E | >9H 7.5N |
| 6F | >9H 7.5N |
| 6G | >9H 5N |
| 6H | >9H 5N |
| 6I | >9H 2.5N |
| 7A | >9H 7.5N |
| 7B | <6B 2.5N |
| 7C | >9H 7.5N |
| 7D | 6B 2.5N |
| 8A | 3H 7.5N |
| 8B | 3B 7.5N |
| CE 1 | >9H 7.5N |
| 9A | >9H 7.5N |
| 9B | >9H 7.5N |
| 9C | >9H 7.5N |
| 11A | 5H 7.5N |
| 11B | 3H 7.5N |
| CE 7 | >9H 7.5N |
| 12 | 3H 7.5N |
| 13 | >9H 7.5N |
| 14 | 6H 7.5N |
| 15 | 3H 7.5N |

TABLE 5

Solvent Resistance

| Ex. No. | Rating |
|---|---|
| 11A | Fail |
| 12 | Fail |
| 13 | Pass |
| 14 | Pass |
| 15 | Pass |

Example 16

A 20% solids adhesive solution was prepared by mixing Polyester resin 1 in MEK in a jar and placing it a roller until dissolved. The resulting adhesive solution was then knife coated onto the exposed second major surface of a bead film prepared as described in Example 7C above using a gap setting of 0.006 inches (0.15 mm), and dried in a forced air oven at 185° F. (85° C.) for 30 minutes. A sample of the adhesive-coated bead film measuring 0.5 inch wide by 4 inches long (12.7 mm by 102 mm) was then laminated to a PC panel using a heat bonder (CERATEK Model 12ASL/1, Sencorp White Company, Hyannis, Mass.) at a temperature setting at 260° F. (127° C.) for 30 seconds. The final bonded article was visually evaluated by unaided eye for air bubbles. Peel adhesion strength was subjectively evaluated by trying to delaminate the PC substrate from the adhesive layer using a metal spatula. It was also evaluated by objectively using a peel adhesion strength test as follows. A 0.5 inch wide (12.7 mm) strip of single coated pressure sensitive adhesive tape having a polyester backing was applied to a 0.5 inch wide (12.7 mm) strip of the exposed beaded surface of the final bonded article and rubbing it down gently by hand to ensure intimate contact. The tape was then peeled back at an angle of 90 degrees at a rate of 12 inches/minute (30.5 cm/minute). The result was recorded in ounces/inch width (oz/in.). Two samples were tested and the results averaged.

Example 17

Example 16 was repeated with the following modification. Polyester resin 2 was dissolved in a solvent mixture of 1,3-dioxolane:cyclohexanone:methanol/85:10:5 (w:w:w). This was used in place of the Polyester resin 1 adhesive solution.

Example 18

Example 17 was repeated with the following modification. Polyester resin 3 was used in place of the Polyester resin 2 adhesive solution.
Results The adhesive bonded bead film articles of Examples 16-18 were found to be completely free of air bubbles. Attempts to cause delamination of Example 16 resulted in "chipping" or breaking off of pieces of the bead film, indicating a strong adhesive bond between the bead film and the PC substrate. Peel adhesion testing was observed to result in adhesive failure between the pressure sensitive adhesive tape and the beaded surface at 28.8 oz/in (31.5 N/dm). This result indicated that the interlayer adhesive strength within the bead film article, as well as between the bead film article and adhesive and between the adhesive and PC substrate were all greater than 28.8 oz/in (31.5 N/dm). Examples 17 and 18 were anticipated to exhibit similar peel adhesion strengths.

Example 19

A two-part polyurethane mixture was prepared by combining and mixing the following
components in a cup using a centrifugal resin mixer (MAX 60 mixing cup and FlackTek Speedmixer DAC 150 FV; both from FlackTek Incorporated, Landrum, S.C.) at 2500 rpm for 30 seconds: 7.15 grams ICN 6, 20.54 grams FPOH 1, and 5.5 microliters of T12 (300 ppm). The approximate ratio of equivalents isocyanate to equivalents hydroxyl was 1.0:1.0.

The mixture was coated onto a borosilicate bead liner having a width of approximately 30.5 cm (12 inches) using a notch bar having a 0.15 mm (0.006 inches) gap at a rate of approximately 3 meters/minute (10 feet/minute) followed by drying in air at room temperature for one hour, then cured at 80° C. (176° F.) in an oven for one hour to provide a binder resin (once) coated bead carrier.

Next, a 100% solids, two-part polyurethane mixture was prepared by combining and mixing the following components in a cup using a centrifugal resin mixer (MAX 60 mixing cup and FlackTek Speedmixer DAC 150 FV; both from FlackTek Incorporated, Landrum, S.C.) at 2500 rpm for 30 seconds: 15.01 grams ICN 1, 19.96 grams POH 1, and 10.5 microliters of T12 (300 ppm). The approximate ratio of equivalents isocyanate to equivalents hydroxyl was 0.95:1. This was then coated between a film of PCPBT and the exposed surface of the binder resin (first) coating using a notch bar coater with a gap setting of 0.076 mm (0.003 inches) greater than the combined thickness of the PCPBT film and once coated bead carrier.

The resulting twice coated, PCPBT film covered, bead film was cured in five stages as follows: 60 minutes at 40° C. (104° F.); 60 minutes at 50° C. (122° F.); 60 minutes at 60° C. (140° F.); 60 minutes at 70° C. (158° F.); and finally for 60 minutes at 80° C. (176° F.) in a forced air oven to provide a transfer article having borosilicate beads which were partially embedded in polyethylene on one side and in the fluorourethane binder resin layer on the other, and a coating of polyurethane resin layer over the fluorourethane binder resin layer and the PCPBT film substrate laminated to the polyurethane resin opposite the fluorourethane.

A 0.42 mm (0.0167 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluoro-urethane layer was obtained by removal of the transfer carrier.

Example 20

Example 19 was repeated with the following modifications. 3.00 grams ICN 1, 21.4 grams FPOH 1, 6.4 grams ethyl acetate, and 5.1 microliters T12 (300 ppm) were employed as the binder resin. The approximate ratio of equivalents isocyanate to equivalents hydroxyl was 1.045:1.0.

A 0.40 mm (0.0156 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluorourethane layer was obtained by removal of the transfer carrier.

Example 21

Example 19 was repeated with the following modifications: 4.00 grams ICN 1, 24.1 grams FPOH 1, 0.83 grams POH 1 and 6.2 microliters T12 (300 ppm) were employed as the binder resin. The approximate ratio of equivalents isocyanate to equivalents hydroxyl was 1.025:1.0.

A 0.44 mm (0.0174 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluorourethane layer was obtained by removal of the transfer carrier.

Comparative Example 9

Example 19 was repeated with the following modifications: 6.99 grams ICN 4, 25.24 grams FPOH 1, and 7.0 microliters T12 (300 ppm) were employed as the binder resin. The approximate ratio of equivalents isocyanate to equivalents hydroxyl was 1.045:1.0. A 0.25 mm (0.010 inch) gap was used when coating the binder resin onto the bead carrier.

A 0.47 mm (0.0185 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluoro-urethane layer was obtained by removal of the transfer carrier.

Comparative Example 10

Example 19 was repeated with the following modifications: 300 grams FPOH 3 was dissolved in 200 grams ethyl acetate to give a 60% solids solution. This solution was used in place of FPOH 1. Next, 25.14 grams of the FPOH 3 solution, 5.21 grams ICN 4, and 6.0 microliters T12 (300 ppm) were added to the mixing cup. The approximate ratio of equivalents isocyanate to equivalents hydroxyl was 1.035:1.0. A 0.13 mm (0.005 inch) gap was used when coating this binder resin onto the bead carrier.

A 0.40 mm (0.0158 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluorourethane layer was obtained by removal of the transfer carrier.

Example 22

To a 1 gallon glass jar were added 1000 grams of FPOH 3 and 1000 grams of ethyl acetate. The jar was placed on a mechanical roller and the solution was mixed for 72 hours at which point the 50% solids polyol solution was clear and homogenous. Next, 1.05 grams T12 (900 ppm) was added to this solution. A 500 ml amber jar was charged with 80 grams ICN 2 and 80 grams ethyl acetate. This isocyanate solution was added to the polyol solution and the combination mixed vigorously for 1 minute. The approximate ratio of equivalents isocyanate to equivalents hydroxyl was 0.7:1.0. It was then coated onto a borosilicate bead carrier using a notch bar coater and a gap of 0.076 mm (0.003 inch) gap greater than the bead carrier thickness. The coating was then dried and cured for 4 minutes at 80° C. then 2 minutes at 90° C. A two-part urethane and PCPBT film substrate were then provided as described in Example 19.

A 0.39 mm (0.0153 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluorourethane layer was obtained by removal of the transfer carrier.

Example 23

Example 19 was repeated with the following modifications: 7.14 grams of ICN 6, 22.27 grams of a 60% solids solution of FPOH 3 in ethyl acetate, 4.14 grams of ethyl acetate, and 6.0 microliters T12 (300 ppm) were used as the binder resin 1. The approximate ratio of equivalents isocyanate to equivalents hydroxyl was 1.0:1.0. A 0.13 mm (0.005 inch) gap was used when coating this binder resin onto the bead carrier.

A 0.40 mm (0.0156 inches) thick, free-standing bead film laminate having a fluorourethane binder resin uniformly coated on one side with partially embedded borosilicate microspheres and on the other side with a 100% solids-based, two part polyurethane resin, and a PCPBT film bonded to the polyurethane layer on the side opposite the fluorourethane layer was obtained by removal of the transfer carrier.

Preparation of FP 5 Aqueous Dispersion

FP 5 was prepared generally as disclosed in Example 1 of U.S. Pat. No. 6,610,807 and listed as C2 terpolymer therein. The resulting polymer dispersion had a solids content of 31 wt % and a composition of TFE:HFP:VDF/45:19:36 (weight percent ratio).

A polymerization vessel having a total volume of 180 liters and equipped with an impeller agitator system was charged with 115 liters of deionized water, 8 grams oxalic acid, 50 grams ammonium oxalate, and 280 grams perfluorooctanoate ammonium salt (PFOA). The vessel was then heated to 60° C. The following materials were then added: ethane to a pressure of 0.85 bar absolute (partial pressure of 0.55 bar), hexafluoropropylene (HFP) to 6.9 bar absolute reaction pressure, vinylidenedifluoride (VDF) to 12.5 bar absolute reaction pressure, and tetrafluoroethylene (TFE) to 15.5 bar absolute reaction pressure. The polymerization was initiated with the addition of 50 milliliters of a 2.6 wt % aqueous potassium permanganate solution. As the reaction began, the reaction pressure of 15.5 bar absolute was maintained by adding TFE, HFP and VDF into the gas phase in a feed ratio of HFP (kilograms):TFE (kilograms) of 0.423:1.0 and a feed ratio of VDF (kilograms):TFE (kilograms) of 0.821:1.0. During the polymerization the potassium permanganate solution was continuously charged into the vessel at a feeding rate 110 milliliters/hour.

After 33.5 kg TFE had been added the monomer feed was discontinued. The addition of potassium permanganate solution was maintained at a feed rate of 40 milliliters/hour. Within 15 minutes, the monomer gas phase had decreased to a vessel pressure of 10.7 bar at which point the reaction vessel was vented.

The resulting polymer dispersion had a solids content of 31% and a composition of TFE:HFP:VDF/45:19:36 (weight percent ratio).

Example 24

An aqueous dispersion of FP5 was used to prepare a binder resin as follows. To a 40 milliter glass vial were added 19.90 grams of deionized water, 2.18 grams MEK, 1.68 grams DEGME and 1.65 grams DPGBE. This was mixed using an analog vortex mixer (VWR International, LLC, Radnor, Pa.) for 30 seconds. Next 12.50 grams of the resulting mixture was placed in a clean 40 milliliter glass vial and 12.51 grams of a 4% solids (w/w) mixture of clay in water was added. This was vortex mixed for an additional 2 minutes before the addition of 16.80 grams FP5 drop-wise with gentle magnetic stirring.

The resulting solution was applied to a 15.2 cm (6 inches) wide borosilicate bead carrier 2, prepared as described above, using a coating square having a gap of 0.20 mm (0.008 inches) at a rate of about 3.0 meters/minute (10 feet/minute). The binder resin coated bead carrier was then dried in air for 30 minutes, then at 150° C. (302° F.) for 5 minutes.

Next, a 100% solids, two-part polyurethane mixture was prepared by combining and mixing the following components in a cup using a centrifugal resin mixer (MAX 40 mixing cup and FlackTek Speedmixer DAC 150 FV; both from FlackTek Incorporated, Landrum, S.C.) at 3450 rpm for 30 seconds: 10.0 grams ICN 1, 12.04 grams POH 1, and ten microliters of T12 (450 ppm). The approximate ratio of equivalents isocyanate to equivalents hydroxyl was 1.05:1. This was then coated between a polyester film and the exposed surface of the binder resin (first) coating using a notch bar coater with a gap setting of 0.08 mm (0.003 inches) greater than the combined thickness of the polyester film substrate and once coated bead carrier.

The resulting twice coated, release liner covered, bead film was cured in a 80° C. (176° F.) forced air oven for 30 minutes to provide a transfer article having borosilicate beads which were partially embedded in polyethylene on one side and in the fluoropolymer binder resin layer on the other, a coating of polyurethane resin over the fluoropolymer binder resin layer, and a polyester film substrate laminated to the polyurethane resin on the side opposite the fluoropolymer.

A 0.420 mm (0.017 inches) thick, free-standing bead film laminate having a fluoropolymer binder resin uniformly coated on one side with partially embedded borosilicate microsphere beads and on the other side with a 100% solids-based, two part polyurethane resin, and a polyester film substrate laminated to the polyurethane resin on the side opposite the fluoropolymer was obtained by removal of the transfer carrier.

Example 25

Example 25 was prepared as described for Example 24 with the following modifications. A coating square having a gap of 10 mm (0.004 inches) and a drying time at 150° C. (302° F.) of 10 minutes was employed.

A 0.44 mm (0.017 inches) thick, free-standing bead film laminate having a fluoropolymer binder resin uniformly coated on one side with partially embedded borosilicate microsphere beads and on the other side with a 100% solids-based, two part polyurethane resin, and a polyester film substrate laminated to the polyurethane resin on the side opposite the fluoropolymer was obtained by removal of the transfer carrier.

Example 26

Example 26 was prepared as described for Example 24 with the following modifications. The dried binder resin coated bead carrier was coated with MEK using a coating square having a gap of 0.20 mm (0.008 inches) and air dried before coating with the polyurethane mixture.

A 0.30 mm (0.012 inches) thick, free-standing bead film laminate having a fluoropolymer binder resin uniformly coated on one side with partially embedded borosilicate microsphere beads and on the other side with a 100% solids-based, two part polyurethane resin, and a polyester film substrate laminated to the polyurethane resin on the side opposite the fluoropolymer was obtained by removal of the transfer carrier.

Example 27

Example 27 was prepared as described for Example 25 with the following modifications. The dried binder resin coated bead carrier was coated with MEK using a coating square having a gap of 0.20 mm (0.008 inches) and air dried before coating with the polyurethane mixture.

A 0.33 mm (0.013 inches) thick, free-standing bead film laminate having a fluoropolymer binder resin uniformly coated on one side with partially embedded borosilicate microsphere beads and on the other side with a 100% solids-based, two part polyurethane resin, and a polyester film substrate laminated to the polyurethane resin on the side opposite the fluoropolymer was obtained by removal of the transfer carrier.

TABLE 6

Stain Resistance - Mustard

| Ex. No. | Stain Resistance (delta b*) (66° C./80% RH/72 hrs) |
|---|---|
| 19 | 7.58 |
| 20 | 33.63 |
| 21 | 44.58 |
| CE 9 | 52.88 |
| CE 10 | 79.68 |
| 22 | 15.27 |
| 23 | 7.01 |
| 24 | 49.27 |
| 25 | 35.17 |
| 26 | 26.93 |
| 27 | 23.93 |

TABLE 7

Coefficient of Friction (COF)

| Ex. No. | COF |
|---|---|
| 19 | 0.151 |
| 20 | 0.173 |
| 21 | 0.181 |
| CE 9 | 0.156 |
| CE 10 | 0.170 |
| 22 | 0.164 |
| 23 | 0.139 |

TABLE 8

Pencil Hardness

| Ex. No. | Pencil Hardness |
|---|---|
| 19 | >10H 7.5N |
| 20 | >10H 7.5N |
| 21 | >10H 7.5N |
| CE 9 | >10H 7.5N |
| CE 10 | >10H 7.5N |
| 22 | >10H 7.5N |
| 23 | >10H 7.5N |

TABLE 9

Solvent Resistance

| Ex. No. | Rating |
|---|---|
| 19 | Pass |
| 20 | Pass |
| 21 | Pass |
| CE 9 | Pass |
| CE 10 | Pass |
| 22 | Pass |
| 23 | Pass |

TABLE 10

Glass Transition Temperature of Fluoropolyurethane Binder Resin (Neat)

| Ex. No. | Tg (° C.) |
|---|---|
| 19 | 62 |
| 20 | 56 |
| 21 | 52 |
| CE 9 | ND |
| CE 10 | 32 |

TABLE 10-continued

Glass Transition Temperature of Fluoropolyurethane Binder Resin (Neat)

| Ex. No. | Tg (° C.) |
|---------|-----------|
| 22 | 25 |
| 23 | 84 |

ND: not determined

The invention claimed is:

1. An article comprising at least a first surface having:
 (a) a binder resin layer having a fluorine-containing polymer, wherein the binder resin layer has a first major surface opposite a second major surface; and
 (b) a plurality of microspheres partially embedded in, and adhered thereto, the first major surface of the binder resin layer, wherein the microspheres have a refractive index of less than about 1.60;
 wherein the fluorine-containing polymer is derived in part from at least one partially fluorinated, or non-fluorinated, monomer; and
 wherein the article exhibits a stain resistance to yellow mustard at elevated temperature and humidity as measured by the change in b* of less than 50.

2. The article of claim 1 wherein the plurality of microspheres are selected from at least one of glass, polymers, glass ceramics, ceramics, metals and combinations thereof.

3. The article of claim 1 wherein the fluorine-containing polymer is selected from at least one of the following: fluoroolefins and fluorourethanes and combinations thereof.

4. The article of claim 1 wherein at least about 40% of the surface of the article is covered with the plurality of microspheres.

5. The article of claim 1 further comprising a reinforcing layer formed on the second major surface of the binder resin layer.

6. The article of claim 5 wherein the reinforcing layer is selected from one of the following: polyurethane resins, acrylic resins, polyester resins, epoxy resins.

7. The article of claim 6 wherein the polyurethane resin is selected from polyurethane dispersions, two part urethanes coated from solvent, 100% solids two part urethanes, and combinations thereof.

8. The article of claim 1 wherein the fluorine content along the polymeric backbone of the fluorine-containing polymer is from about 27% to 72% by weight.

9. The article of claim 1 further comprising a substrate layer disposed on a surface other than the first major surface of the binder resin layer.

10. The article of claim 1 further comprising an adhesive layer disposed on a surface other than the first major surface of the binder resin layer.

11. The article of claim 1 wherein the fluorine-containing polymer is derived from aqueous dispersions of at least one partially fluorinated, or non-fluorinated, monomer.

12. An article comprising at least a first surface having:
 (a) a binder resin layer having a fluorine-containing polymer, wherein the binder resin layer has a first major surface opposite a second major surface; and
 (b) a plurality of microspheres partially embedded in, and adhered thereto, the first major surface of the binder resin layer, wherein the microspheres have a refractive index of less than about 1.60;
 wherein the fluorine-containing polymer is derived in part from at least one partially fluorinated, or non-fluorinated, monomer; and
 wherein the article is a thermoformable article exhibiting chemical resistance according to ASTM D5402-06.

13. The article of claim 12 wherein the fluorine-containing polymer is selected from at least one of the following: fluoroolefins and fluorourethanes and combinations thereof.

14. The article of claim 12 wherein at least about 40% of the surface of the article is covered with the plurality of microspheres.

15. The article claim 12 further comprising a reinforcing layer formed on the second major surface of the binder resin layer.

16. The article of claim 15 wherein the reinforcing layer is selected from one of the following: polyurethane resins, acrylic resins, polyester resins, epoxy resins.

17. The article of claim 12 wherein the fluorine content along the polymeric backbone of the fluorine-containing polymer is from about 27% to 72% by weight.

18. The article of claim 12 wherein the article of embodiment exhibits a stain resistance to yellow mustard at elevated temperature and humidity as measured by the change in b* of less than 50.

19. The article of claim 12 wherein the fluorine-containing polymer is derived from aqueous dispersions of at least one partially fluorinated, or non-fluorinated, monomer.

* * * * *